(12) United States Patent
Lee et al.

(10) Patent No.: US 10,437,360 B2
(45) Date of Patent: Oct. 8, 2019

(54) METHOD AND APPARATUS FOR MOVING CONTENTS IN TERMINAL

(71) Applicant: Samsung Electronics Co., Ltd., Gyeonggi-do (KR)

(72) Inventors: Kiwon Lee, Gyeonggi-do (KR); Sangheon Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 922 days.

(21) Appl. No.: 13/759,175

(22) Filed: Feb. 5, 2013

(65) Prior Publication Data

US 2013/0222301 A1  Aug. 29, 2013

(30) Foreign Application Priority Data

Feb. 24, 2012 (KR) .................. 10-2012-0019351

(51) Int. Cl.
*G06F 3/041* (2006.01)
*G06F 3/033* (2013.01)
(Continued)

(52) U.S. Cl.
CPC .............. *G06F 3/041* (2013.01); *G06F 3/017* (2013.01); *G06F 3/0485* (2013.01);
(Continued)

(58) Field of Classification Search
CPC ............. G06F 3/041–047; G06F 3/017; G06F 3/048–04886; G06F 3/04883;
(Continued)

(56) References Cited

U.S. PATENT DOCUMENTS 5,818,425 A * 10/1998 Want et al. .................. 345/158
6,493,008 B1 * 12/2002 Yui .............................. 715/840
(Continued)

FOREIGN PATENT DOCUMENTS

CN  101398739 A  4/2009
CN  101714056 A  5/2010
(Continued)

OTHER PUBLICATIONS

Chinese Search Report dated Sep. 5, 2017.
(Continued)

*Primary Examiner* — Dismery Mercedes
(74) *Attorney, Agent, or Firm* — Cha & Reiter, LLC

(57) ABSTRACT

Provided are a method and apparatus for moving contents on a screen in a terminal which allows a user to scroll in various directions within a contents page larger than a screen. An initial threshold region is established, which surrounds an initial touch point over displayed contents. A drag movement is detected from the initial touch point to a current touch point breaching the initial threshold region. The contents are moved in the direction of the drag movement if the current touch point is outside predetermined X and Y channels. The contents are moved in only the X or Y direction if the current touch point is within the X or Y channel, respectively. Thus, linear scroll of contents can be produced despite an unintentional nonlinear drag movement.

9 Claims, 20 Drawing Sheets

(51) Int. Cl.
*G06F 3/0485* (2013.01)
*G06F 3/0488* (2013.01)
*G06F 3/01* (2006.01)
*H04N 5/262* (2006.01)
*G06F 3/0354* (2013.01)
*G06F 3/0484* (2013.01)

(52) U.S. Cl.
CPC ........ *G06F 3/0488* (2013.01); *G06F 3/04883* (2013.01); *G06F 3/03547* (2013.01); *G06F 3/0484* (2013.01); *H04N 5/2628* (2013.01)

(58) Field of Classification Search
CPC .. G06F 3/0488; G06F 3/0482; G06F 3/04845; G06F 3/0485; G06F 3/0416; G06F 3/0412; G06F 3/0484; G06F 3/03547; G06F 8/38
USPC ........ 345/173–178; 178/18.01–18.09, 18.11; 715/863
See application file for complete search history.

(56) References Cited

U.S. PATENT DOCUMENTS

| | | | |
|---|---|---|---|
| 9,310,991 B2* | 4/2016 | Kim | G06F 3/0488 |
| 10,191,643 B2* | 1/2019 | Hauser | G06F 3/0485 |
| 2002/0093491 A1 | 7/2002 | Gillespie et al. | |
| 2005/0108620 A1* | 5/2005 | Allyn | G06F 3/04842 715/255 |
| 2006/0048071 A1* | 3/2006 | Jarrett | G06F 3/0485 715/784 |
| 2006/0052166 A1 | 3/2006 | Ohta | |
| 2006/0070007 A1 | 3/2006 | Cummins et al. | |
| 2009/0142871 A1 | 6/2009 | Ohtsuka et al. | |
| 2009/0262089 A1* | 10/2009 | Wang | G06F 3/04883 345/173 |
| 2009/0292989 A1* | 11/2009 | Matthews | G06F 3/0488 715/702 |
| 2010/0007623 A1* | 1/2010 | Kaneko | G06F 3/04817 345/173 |
| 2010/0066705 A1* | 3/2010 | Keely | G06F 1/1626 345/179 |
| 2010/0079501 A1* | 4/2010 | Ikeda et al. | 345/661 |
| 2010/0097337 A1* | 4/2010 | Lin et al. | 345/173 |
| 2010/0149115 A1 | 6/2010 | Park et al. | |
| 2010/0188344 A1 | 7/2010 | Shirakawa et al. | |
| 2011/0043456 A1* | 2/2011 | Rubinstein | G06F 3/0485 345/173 |
| 2011/0080359 A1* | 4/2011 | Jang et al. | 345/173 |
| 2011/0119620 A1 | 5/2011 | Shon et al. | |
| 2011/0154196 A1* | 6/2011 | Icho et al. | 715/702 |
| 2011/0185321 A1* | 7/2011 | Capela | G06F 3/0488 715/863 |
| 2011/0199312 A1* | 8/2011 | Okuta | G06F 3/0416 345/173 |
| 2011/0241985 A1* | 10/2011 | Hill | G06F 3/017 345/157 |
| 2012/0084689 A1* | 4/2012 | Ledet | G06F 3/0486 715/769 |
| 2012/0133680 A1* | 5/2012 | Hoover | G06F 3/0486 345/677 |
| 2012/0162261 A1* | 6/2012 | Kim | G06F 3/017 345/647 |
| 2013/0106744 A1* | 5/2013 | Asakura | G06F 3/0485 345/173 |

FOREIGN PATENT DOCUMENTS

| | | |
|---|---|---|
| CN | 102221966 A | 10/2011 |
| EP | 2 112 584 A1 | 10/2009 |
| JP | 2006-68385 A | 3/2006 |
| JP | 2010-86230 A | 4/2010 |
| JP | 2010-170479 A | 8/2010 |
| JP | 2012-503223 A | 2/2012 |
| JP | 2013-92942 A | 5/2013 |
| KR | 10-2007-0096547 A | 10/2007 |
| KR | 10-2011-0010096 A | 1/2011 |
| RU | 2 417 401 C2 | 7/2006 |
| TW | 2009-45100 A | 11/2009 |
| WO | 97/36225 A1 | 10/1997 |
| WO | 2009/142871 A2 | 11/2009 |

OTHER PUBLICATIONS

Russian Search Report dated Sep. 25, 2017.
European Search Report dated Jul. 13, 2018.
Japanese Search Report, dated Dec. 5, 2016.
Chinese Search Report, dated Jun. 2, 2016.

* cited by examiner

METHOD AND APPARATUS FOR MOVING CONTENTS IN TERMINAL

CLAIM OF PRIORITY

This application claims the benefit under 35 U.S.C. § 119(a) of a Korean patent application filed on Feb. 24, 2012 in the Korean Intellectual Property Office and assigned Serial No. 10-2012-0019351, the entire disclosure of which is hereby incorporated by reference.

BACKGROUND

1. Technical Field

The present disclosure relates generally to contents display management in an electronic device, and more particularly to a method and an apparatus for moving contents of a touch screen display device.

2. Description of the Related Art

Portable electronic devices with displays such as smart phones and tablet PCs have small screens such that only a portion of a contents page at a desired zoom may be visible at any given time (i.e., a zoom providing a desired text size or image size of the contents). Many designs allow the user to scroll within a contents page, thereby displaying a different portion of the contents page on the screen at a time. In this manner, the entire contents page is eventually viewed in stages. For example, a contents page may be a single image that is enlarged beyond the screen size, such that the entire image at its current enlargement could only be viewed simultaneously on a larger screen.

Devices typically allow the user to scroll the contents in 360 degrees of freedom to view any part thereof. However, there is a problem in that contents can be moved in an unintended direction of a user due to unintended operation error or a measuring error with respect a moving direction.

SUMMARY

The present disclosure provides a method for moving contents which moves and displays contents in a predetermined direction in consideration of a simple operation mistake of a user or a measuring error with respect to a moving direction.

In accordance with an aspect of the present invention, a method for moving contents in a terminal having a touch screen includes: detecting a touch point on the touch screen; setting the touch point as a starting point; computing a location change amount of a movement from the starting point to a current touch point; determining a direction of the movement when the computed location change amount is beyond a preset threshold region based on the starting point; and moving the contents in the determined direction.

In accordance with another aspect of the present invention, an apparatus for moving contents includes: a display unit for displaying the contents; a touch screen for generating a touch event in response to a touch gesture with respect to the displayed contents; and a controller for controlling such that the displayed contents are moved based on the touch event input from the touch screen, wherein the controller detects a touch point on the touch screen, sets the touch point as a starting point, compute a location change amount of a movement from the starting point to a current touch point, determines a direction of the movement when the computed location change amount is beyond a preset threshold region based on the starting point and moves the contents in the determined direction.

BRIEF DESCRIPTION OF THE DRAWINGS

The above features and advantages of the present invention will be more apparent from the following detailed description in conjunction with the accompanying drawings, in which.

DETAILED DESCRIPTION OF EXEMPLARY EMBODIMENTS

A method and an apparatus for moving contents using a touch screen according to exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

An apparatus for moving contents according to the present invention is responsive to a pointing device or a user's touch input. As used herein, "pointer" refers to either a physical pointing device controlling a cursor or making touch contact with the screen, or to a user's finger contacting the screen. It will be apparent that the apparatus for moving contents according to the present invention is applicable to various information and communication devices and multimedia device such as a portable phone, a smart phone, a tablet PC, a hand-held PC, a Portable Multimedia Player (PMP), a Personal Digital Assistant (PDA), a music player (e.g., MP3 player), a portable game terminal, a digital broadcasting player, and application devices thereof. Here, as generally known in the art, the pointer includes a write pen, a stylus, a mouse, a touch pad, a track ball, and a touch input means of a touch screen. Hereinafter, it is assumed in the exemplary embodiments that a touch input means is used.

Figure 1:
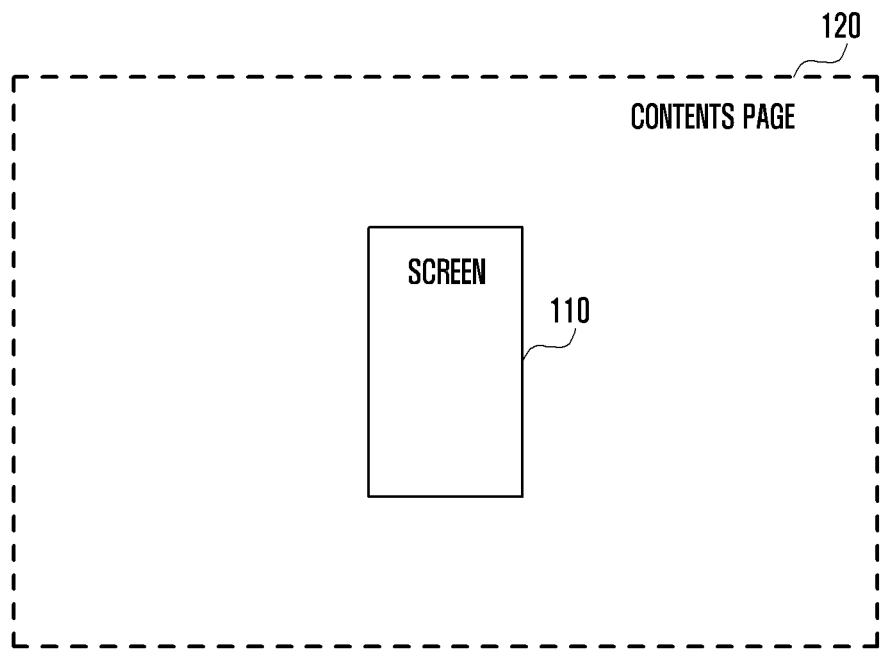
FIG. 1 is a conceptual diagram illustrating a screen of an apparatus for moving contents and contents displayed through it according to an exemplary embodiment of the present invention.

FIG. 1 is a conceptual diagram illustrating a screen 110 of an apparatus for moving contents and contents displayed through it according to an exemplary embodiment of the present invention. As illustrated, the screen 110 displays only a part of a contents page 120 (hereafter, a contents page is referred to as just "contents"). In other words, the contents at a current zoom setting has a size is larger than that of the screen 110. Here, the contents 120 may include photographs, web pages, or documents. When scroll occurs, the apparatus for moving contents moves the contents 120 in a scroll direction to display a new part of the contents 120. For example, when the user scrolls the contents downward, the new part of the contents appears in an upper part of the screen, so that an existing displayed part under a screen disappears. Here, the scroll refers to an operation responsive to detecting movement of a touch input means such as the user's finger in a predetermined direction while touch contact with the screen is maintained. This type of scroll is called a drag. Meanwhile, while the user may intend to scroll the content in a particular direction, the scroll direction detected may be non-uniform, contrary to the user's intention. When the apparatus for moving contents is highly sensitive in a scroll direction, a problem arises in that the contents 120 are prone to be moved in an unintended direction. In the course of scroll, an unintended operation mistake may occur more frequently as compared with the start of scroll. For example, when the user scrolls a screen of a smart phone upward using her thumb, the thumb moves in the path of a parabola. That is, a moving direction of the thumb in initial scroll is vertical. However, as the thumb moves, it becomes a curved direction. Contrary to the user's intention, corresponding contents are then moved into a parabola direction. To solve this problem, embodiments herein provide an algorithm for producing linear movement of contents, e.g., X (horizontal) or Y (vertical) direction movement, even if a non-linear drag is detected on the touch screen (where the detected nonlinearity is within predetermined limits).

Figure 2:
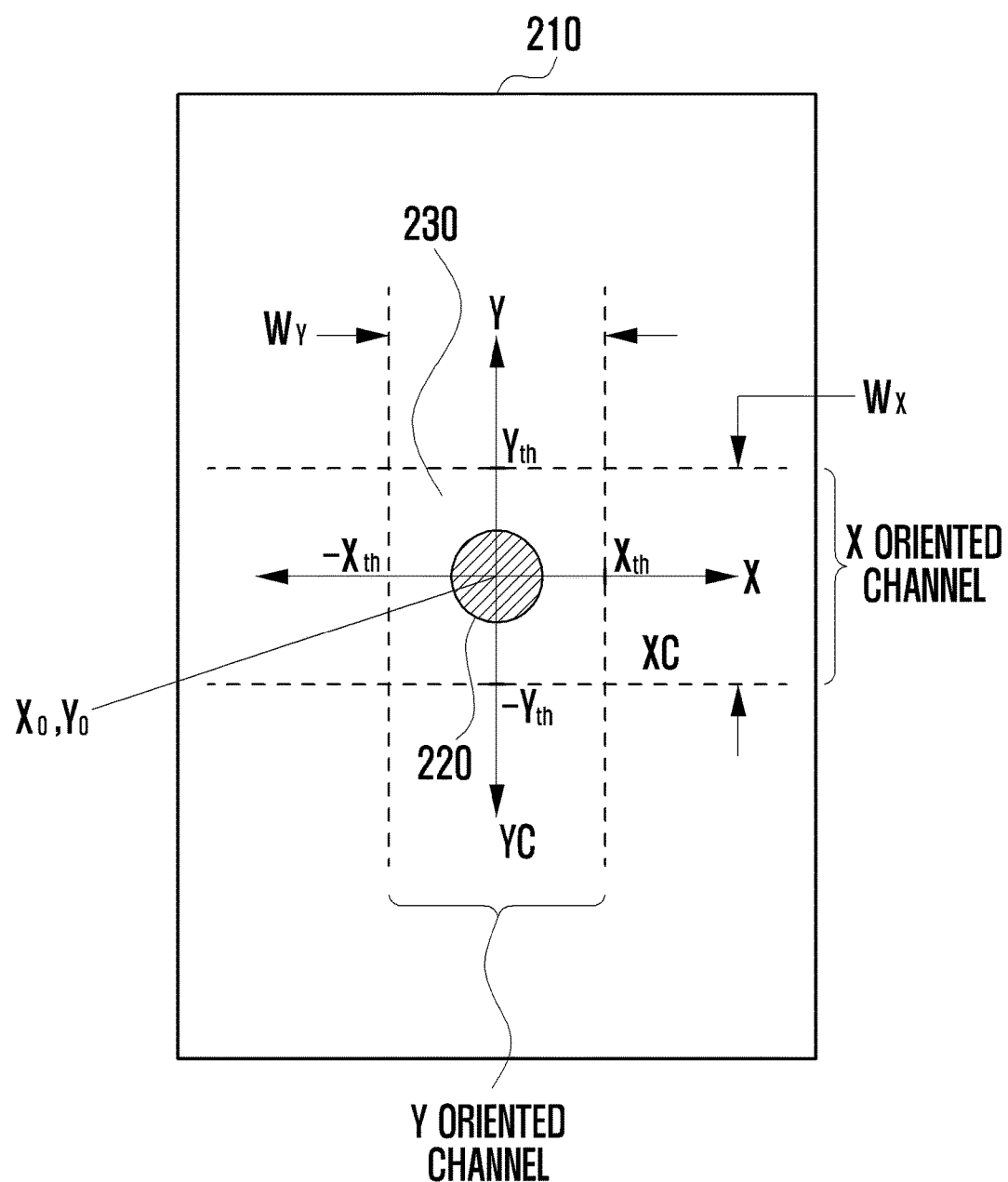
FIG. 2 is a conceptual diagram illustrating an algorithm for determining presence of generation and a direction of a scroll according to an exemplary embodiment of the present invention.

FIG. 2 is a conceptual diagram illustrating a method for determining scroll initiation and direction according to an exemplary embodiment of the present invention. Broadly, the method involves establishing an initial threshold region 230 surrounding an initial touch point 220 over displayed contents. A drag movement from the initial touch point to a current touch point breaching the initial threshold region is detected. The contents are moved in the direction of the drag movement if the current touch point is outside predetermined X and Y channels. The contents are moved in only the X or Y direction if the current touch point is within the X or Y channel, respectively.

More specifically, in the example of FIG. 2, it is assumed the user initially touches a touch screen 210 at "point" 220 which has a center at coordinates $x_0, y_0$. (The shaded circle designated as 220 represents an area of a touch input means contacting the screen; the apparatus calculates a center point of the touch area to establish accurate coordinates $x_0, y_0$ averaging the area of touch.) Point 220 is referred to hereafter as the start point or a "previous point", the latter label being used in the context of discussing the location of a new touch point on the screen following a drag operation from point 220. When the screen 210 is viewed normally, a row of text, for example, is oriented horizontally, which is considered the X direction.

An initial threshold region 230 is established surrounding the start point 220. In the example of FIG. 2, threshold region 230 is defined as the area bounded by the intersection of an X oriented channel XC ("X channel") and a Y oriented channel YC ("Y channel"). The X channel has an initial width $W_X$; the Y channel has an initial width $W_Y$. When drag movement from start point 220 to a current point is detected to breach the threshold region 230, the location of the current point is detected (also referred to as the breach point). If the breach point is within the X channel, the apparatus moves the contents in the X direction by an amount corresponding to the X component of the current point (relative to the X coordinate of the start point 220). Similarly, when the breach point is within the Y channel, the apparatus moves the content in the Y direction by a distance corresponding to the Y component of the breach point. Thus, in these cases, even if the user's drag movement is slightly skewed, the contents are moved in the direction of the user's intended X or Y direction. After the initial threshold region 230 is breached in this manner and the contents initially moved X or Y, the width of at least the X or Y channel of contents movement may be enlarged (reset). Thereafter, the apparatus determines whether a continuing drag movement remains within the enlarged channel, and if so, the contents continue to be moved correspondingly in the same X or Y direction.

If the user initially performs a drag from point 220 non-linearly (i.e., obliquely or diagonally) such that the breach point is outside both the X and Y channels, the apparatus moves the contents not in the X or Y directions but in the direction of the drag. It is noted here, that in the example of FIG. 2, the initial threshold region may be rectangular or square, such that a non-linear breach point would occur at any of the four corners of the rectangle or square. Alternatively, the threshold region may be predetermined to be an L shape, with the two legs of the L extending into the X and Y channels. In this option, more leeway is provided to discern an initial breach of the threshold region in a non-linear direction.

In more detail, for the rectangular threshold region example of FIG. 2, when an X axis change amount ($dx=x_n-x_{n-1}$; where, $x_{n-1}$ is the x coordinate of previous point 220, $x_n$ is the x coordinate of a current point, n is 0 or positive integer) from exceeds an X axis threshold $X_{th}$ and a Y change amount ($dy=y_n-y_{n-1}$) is less than or equal to a Y axis threshold $Y_{th}$ with the currently detected point 220 as the starting point, the apparatus for moving contents of the present invention (hereafter, "the apparatus") determines a scroll direction as a horizontal direction, namely, an X axis, and moves and displays the contents in a horizontal direction. For example, the apparatus for moving contents moves and displays the contents in a horizontal direction by dx (the X component of the drag movement from the start point 220). Meanwhile, when $dx \leq X_{th}$ and $dy > Y_{th}$, the apparatus determines the scroll direction as a vertical direction, namely, a Y axis, and moves and displays the contents in the vertical direction. For example, the apparatus moves and displays the contents in a vertical direction by dy (the Y component of the drag movement). Further, when $dx > X_{th}$ and $dy > Y_{th}$, the apparatus determines the scroll direction as a non-linear direction and moves and displays the contents in the non-linear direction. For instance, the apparatus moves and displays the contents in the horizontal direction by dx and in the vertical direction by dy. Further, when the dx and the dy are less than or equal to corresponding thresholds, respectively, the apparatus determines that the scroll does not occur in the starting point 220 yet, and does not move the contents. In other words, only when a user touch with respect to the screen is beyond the threshold region 230 determined by $X_{th}$ and $Y_{th}$ in relation to the starting point 220, the apparatus determines that the scroll occurs. Note that the starting point 220 of a threshold region 230 has been described as a point at which a touch input means first touches the screen at the start of a drag; however, it may also be considered a point at which a prior drag has become suspended after having stopped for a predetermined time. In the latter case, the apparatus may have reset an algorithm to detect any subsequent drag as a new drag from the point 220 (with X and Y channel widths reset to initial widths).

The threshold region may be enlarged in the course of scroll. That is, if the scroll starts, the apparatus may enlarge the threshold region in stages to maintain the scroll in an initially set direction. For example, when the scroll direction is determined as a vertical direction, an X axis threshold may be increased by twice as compared with a prior value. Further, for example, if the Y axis change amount dy exceeds 2 cm based on the starting point in a vertical state, the X axis threshold may be increased by three times as compared with a prior value. Moreover, when the scroll stops, the X axis threshold may be reset to the prior value. The threshold region can be described in units of pixels. For example, a first threshold region initially set may be 16 pixels (e.g., a square, rectangular or L shaped region encompassing 16 pixels). When the scroll starts, a new threshold region may be established as 32 pixels.

When the Y axis change amount dy exceeds a predetermined distance, the threshold region may be enlarged to 64 pixels. As described above, the threshold region may be enlarged in stages according to the progress of the scroll. Here, although the number of stages of the threshold region expansion in the above example is two, only one stage, or at least three stages, are possible.

Figure 3:
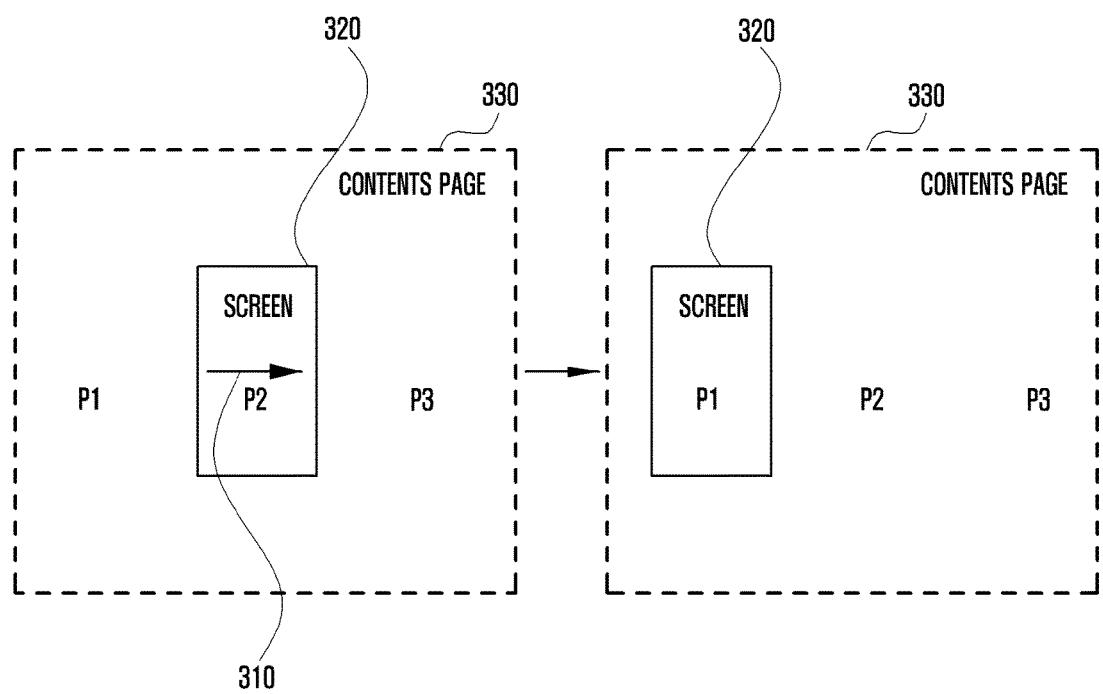
FIGS. 3 to 5 are conceptual diagrams illustrating a procedure of moving contents in vertical, horizontal, and non-linear directions according to an exemplary embodiment of the present invention.
Figure 4:
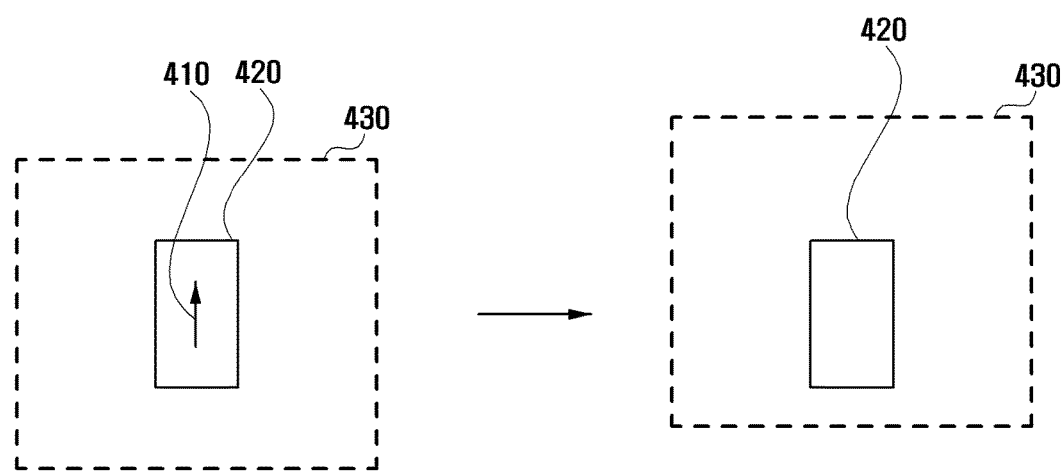
Figure 5:
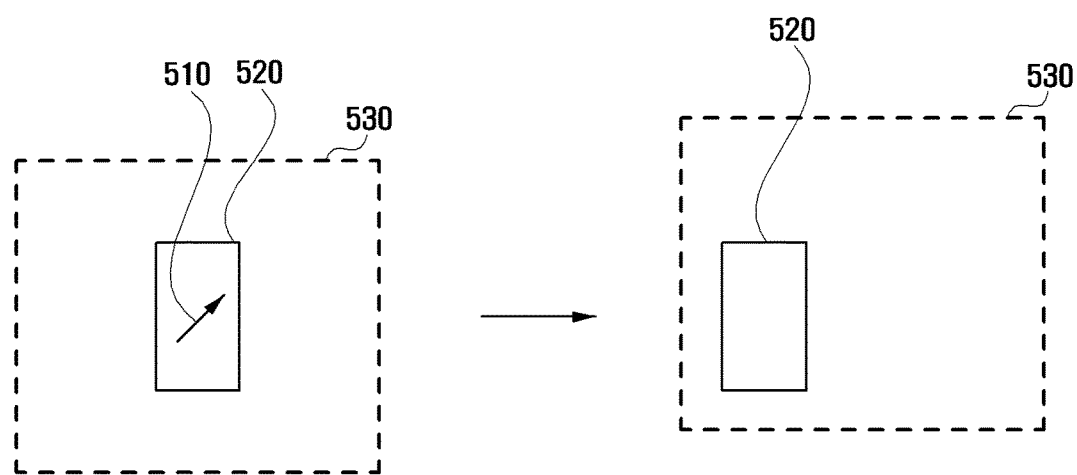

FIGS. 3, 4 and 5 are conceptual diagrams illustrating a procedure of moving contents in vertical, horizontal, and non-linear directions, respectively, according to an exemplary embodiment of the present invention. Referring to FIG. 3, a screen 320 of the apparatus initially displays a central portion P2 of the contents of a contents page 330. When it is determined that the scroll direction 310 is horizontal to the right (X direction), the apparatus moves and displays contents 330 in a right direction based on the screen 320. That is, a left side portion P1 of the contents page 330 is displayed in screen 320 after the rightward scroll. Although not shown, when it is determined that the scroll direction is to the left side, the apparatus moves and displays the right hand side contents P3 of the contents page 330 in the screen 320. In the meantime, referring to FIG. 4, when it is determined that the scroll direction 410 is an upper direction, the apparatus for moving contents moves and displays the contents 430 upward based on the screen 420. Although not shown, when it is determined when the scroll direction is a lower direction, the apparatus moves and displays the contents downward based on the screen. In addition, referring to FIG. 5, when it is determined that the scroll direction 510 is a non-linear direction, namely, north-east direction, the apparatus moves and displays the contents the north-east direction based on the screen 520. Although not shown, the apparatus for moving contents may move and display the contents in other non-linear directions. Non-linear, as used herein, refers to any oblique direction off the X and Y axes, such that more than four diagonal directions are possible. Preferably, 360 degrees of freedom of scroll movement is provisioned.

Figure 6:
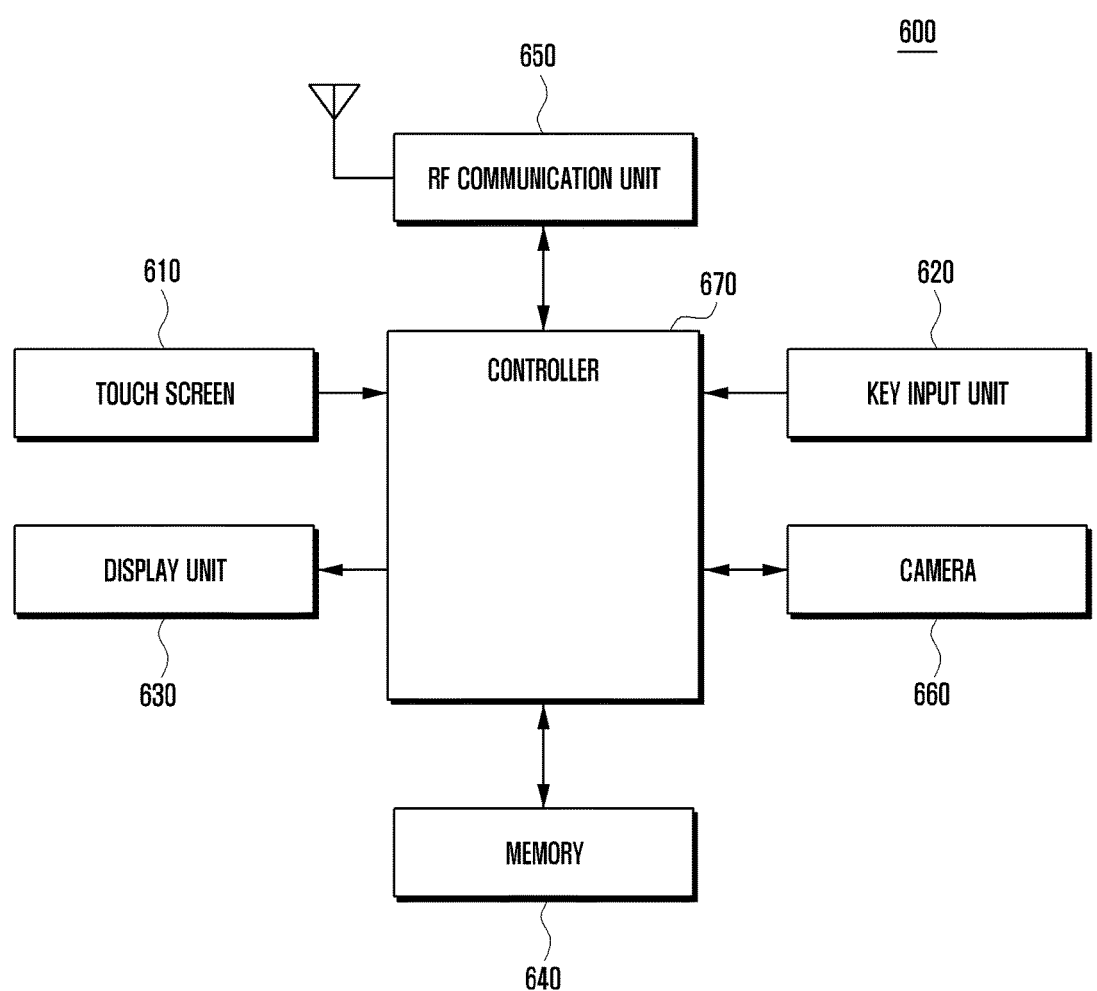
FIG. 6 is a block diagram illustrating a configuration of an apparatus for moving contents according to an exemplary embodiment of the present invention.

FIG. 6 is a block diagram illustrating a configuration of an apparatus for moving contents according to an exemplary embodiment of the present invention. Referring to FIG. 6, an example apparatus 600 for moving contents according to the present invention includes a touch screen 610, a key input unit 620, a display unit 630, a memory 640, a radio frequency (RF) communication unit 650, a camera 660, and a controller 670.

When scroll occurs while displaying a part of contents larger than a screen, apparatus 600 determines a direction of the occurred scroll. Further, apparatus 600 moves contents based on the determined direction of the scroll to display another part of the contents. Further, the apparatus 600 detects a location of a touch, and may fix an initially touched point to a starting point of a threshold region. If there is no location change of a touch for a predetermined time in another location after movement of the touch, the apparatus 600 may reset the corresponding point as the starting point. If the user does not release the touch input means (e.g., finger or stylus), that is, while the user maintains touch contact, an initial touched point may remain as a starting point of scroll. Further, apparatus 600 may set the starting point as a touched point detected in a previous time point $t_{n-1}$ based on a time point $t_n$ when a current touched point is detected. Moreover, when scroll starts, the apparatus 600 may enlarge a threshold region to maintain the scroll in an initially set direction. For example, apparatus 600 is applicable to a smart phone having a four inch screen of 480*800 resolution. In a case of the smart phone, the size of the initial threshold region may be 32 pixels. Further, after generation of the scroll, the size of the threshold region may be changed to 128 pixels. The size of the threshold region may be determined based on touch sensitivity of the touch screen 110, a touch type of the touch screen 110, and an experimental result (pattern information associated with touching habits of the user) as well as the resolution and the screen size. Respective components of the apparatus 600 will now be described in detail.

The touch screen 610 is mounted in front of the display unit 630, generates an analog signal (referred to as a "touch event") in response to touch contact on the touch screen 610, converts the analog signal into a digital signal, and transfers the digital signal to the controller 670. Accordingly, the controller 670 may detect the touch event input from the touch screen 610 to control the foregoing components. The user gesture is divided into a touch and a touch gesture. Here, the touch gesture may be classified into tap, double tap, long tap, drag, drag & drop, flick, and press. A touch is an operation where a user contacts one "point" of a screen by a touch input means (e.g., finger or stylus pen), where the area encompassed by the point is of course dependent upon the physical area of the touch input means, and coordinates of a central point in the area are determined as a start point. "Touch" means a state contacted on the touch screen; "touch gesture" means movement from start of the touch on the touch screen to release of the touch. A tap is an operation in which the touch input means is released from a corresponding point without movement of the touch input means after touching one point. A double tap is an operation where a user taps one point twice. A long tap is an operation where a touch input means is released from a corresponding point without movement of the touch input means after the point is touched for a predefined time longer than that for a tap. A drag is an operation in which touch contact by a touch input means is maintained on the touch screen while the touch input means is moved in a direction along the screen surface. The drag & drop is an operation in which a virtual object is dropped into a folder of the like after a user releases touch contact following a drag. A flick is an operation that escapes a finger after moving it by bouncing at high speed like flipping. The press is an operation of pressing a corresponding point without movement of the finger after touching one point by the touch input means. The touch screen 610 may include a pressure sensor to detect pressure of a touched point. The detected pressure information is transferred to the controller 670, and the controller 670 may distinguish the touch from the press based on the detected pressure information. Further, a resistive type, a capacitive type, and an electromagnetic induction type are applicable as the touch screen 610. The controller 670 detects a touch gesture from a touch event input from the touch screen 610 to determine a moving direction of contents based on the detected touch gesture. Particularly, when scroll occurs beyond a threshold region 230 of FIG. 2 while a part of the contents is being displayed, the controller 670 determines a direction of the scroll and moves the contents in the determined direction.

The key input unit 620 may include a plurality of input keys and function keys for receiving input of numerals and character information and for setting various functions. The function keys may include arrow keys, side keys, and short keys set such that a certain function is performed. Further, the key input unit 620 generates and transfers a key signal associated with user setting and function control of the portable terminal 600 to the controller 670. The key signal may be classified into a power on/off signal, a volume control signal, a screen on/off signal, and the like. The controller 670 controls the foregoing components in response to the foregoing key signal. The key input unit 620 may include a Qwerty key pad, a 3*4 key pad, a 4*3 key, or the like. Further, the key input unit 620 may include only at least one side key for screen on/off and portable terminal on/off which is provided in a side of a case of the portable terminal when a touch screen 610 of the portable terminal 600 is supported in a form of a full touch screen.

The display unit 630 converts image data input from the controller 670 into an analog signal, and displays the analog signal under control of the controller 670. That is, the display unit 130 may provide various screens according to use of the portable terminal, for example, a lock screen, a home screen, an application (hereinafter referred to 'App') execution screen, a menu screen, a message creation screen, a call screen, an Internet screen, and a key pad screen. The lock screen may be defined as an image displayed when a screen of the display unit 630 is turned-on. If a certain touch event for lock release is generated, the controller 670 may switch the displayed image from the lock screen to the home screen or the App execution screen. The home screen may be defined as an image including a plurality of App icons corresponding to a plurality of applications, respectively. If one is selected from a plurality of App icons, the controller 670 may execute a corresponding application and switch the displayed image to an execution screen of a corresponding application.

The display unit 130 may be configured by a flat panel display such as a Liquid Crystal Display (LCD) or an Organic Light Emitted Diode (OLED).

The display unit 630 may include a 3D implementing unit for displaying a left image and a right image, and allowing a user to feel depths of the left and right images. As well known to those skilled in the art, a 3D implementing scheme is divided into a spectacle scheme and a free spectacle scheme. Since the 3D implementing scheme is known in the art, a detailed description is omitted.

The memory 140 may store an operating system (OS), applications necessary for the invention, and various data. The memory 140 stores a screen image to be output on the display unit 630 as well as an application program necessary for a function operation according to the embodiment of the present invention. Further, the memory 640 may store a key map or a menu map for operating the touch screen 610. Here, the key map and the menu map may be various forms. That is, the key map may be a key map, a 3*4 key map, a Qwerty key map, or a control key map for controlling a currently activated application program. Further, the menu map may be a menu map for controlling a currently activated application program.

The memory 640 may chiefly include a program area and a data area. The program area may store an operating system (OS) for booting the apparatus for moving contents and the foregoing components, and an application program for supporting various user functions, for example, a user function for supporting a call function, a web browser for accessing an Internet server, an MP3 user function for playing other sound sources, an image output function for playing photographs, and a moving image playback function. Particularly, the program area of the present invention may store an algorithm for detecting scroll initiation and determining direction of the scroll and an algorithm for resetting a starting point and a threshold region (e.g., resetting X and Y channel widths as described above) of the scroll. The data area is an area for storing data created according to use of the apparatus for moving contents, and may store phone book data, at least one icon according to a widget function, and various contents. In particular, the data area may temporarily store a first starting point and a reset starting point of scroll created when a part of the contents is displayed. Further, the data area may store a first starting point preset value indicating whether to set a first touched point $(x_0, y_0)$ or a previous touched point $(x_{n-1}, y_{n-1})$ as the starting point. Further, when the first touched point $(x_0, y_0)$ is set as the starting point, the data area may store a second starting point preset value indicating a reset starting point. The preset values for the starting point may be set by the user. That is, the controller 670 may transfer a preset value input through the touch screen 610 or the key input unit 620 to the memory 640, and the memory 640 may stored the transferred preset value in the data area.

The RF communication unit 650 performs a voice call, an image call or data communication under control of the controller 670. To this end, the RF communication unit 650 may include an RF transmitter (not shown) up-converting a frequency of a transmitted signal and amplifying the signal and an RF receiver (not shown) low-noise-amplifying a received signal and down-converting the signal. Further, the RF communication unit 650 may include mobile communication modules (e.g., a 3-Generation mobile communication module, a 3.5-Generation mobile communication module, or a 4-Generation mobile communication module, etc.) and a Wi-Fi module.

The camera 660 photographs a subject and outputs an image of the photographed subject to the controller 670, and may include a front camera disposed in front of the device and a rear camera disposed in a rear surface.

The controller 670 controls an overall operation of the portable terminal 600, signal flow between internal components of the portable terminal 600, and processes data. Further, the controller 670 controls power supply to the internal components in a battery. Moreover, the controller 670 executes various applications stored in the program area. In particular, the controller 670 according to the present invention performs scroll in response to a detected touch gesture. To do this, the controller 670 may include the components as illustrated in FIG. 7.

Figure 7:
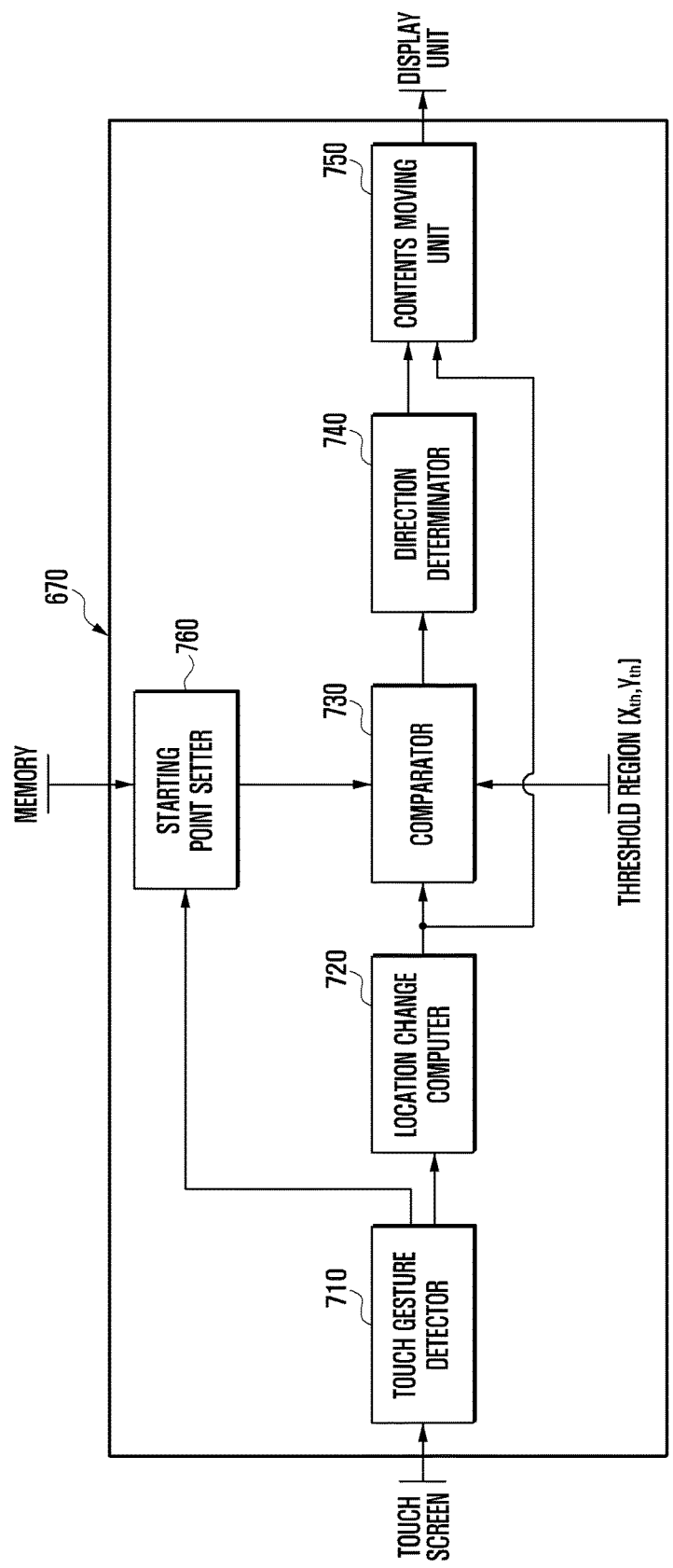
FIG. 7 is a block diagram illustrating a configuration of a controller according to an exemplary embodiment of the present invention.

FIG. 7 is a block diagram illustrating a configuration of a controller 670 according to an exemplary embodiment of the present invention. Controller 670 may include a touch gesture detector 710, a location change computer 720, a comparator 730, a direction determinator 740, a contents moving unit 750, and a starting point setter 760.

The touch gesture detector 710 is connected to the touch screen 610, receives a touch event from the touch screen 610, and detects a touch gesture of the user from the received touch event. That is, the touch gesture detector 710 may detect a touched point, a moving distance of a touch, a moving direction of the touch, and speed of the touch (all typically drag operations). The location change computer 720 receives touch information associated with a touch gesture from the touch gesture detector 710, and computes a location change amount from a starting point to a current touched point, namely, an X axis change amount dx or $\Delta x(x_n-x_0)$ and a Y axis change amount dy or $\Delta y(y_n-y_0)$ based on the received touch information. The comparator 730 compares the X axis change amount and the Y axis change amount with an X axis threshold and a Y axis threshold, respectively. The direction determinator 740 determines a moving direction of the touch based on the comparison result of the comparator 730. The contents moving unit 750 moves the contents in a direction determined by the direction determinator 740 and controls the display unit 630 to display a corresponding part of the moved contents. The starting point setter 760 sets a starting point based on the touch information input from the touch gesture detector 710 and a preset starting point value stored in the memory 640. For instance, the starting point setter 760 may set a first touched point $(x_0, y_0)$ as the starting point. Further, when there is no location change of a touch in a current touched point $(x_n, y_n)$ after movement of the touch, the starting point setter 760 may reset the current touched point $(x_n, y_n)$ as the starting point. Further, the starting point setter 760 may set a previous touched point $(x_{n-1}, y_{n-1})$ as the starting point. The starting point setter 760 transfers the reset starting point to the comparator 730. An operation of the controller 670 having components as illustrated in FIG. 7 will be described with reference to FIGS. 8 to 10.

Figure 8:
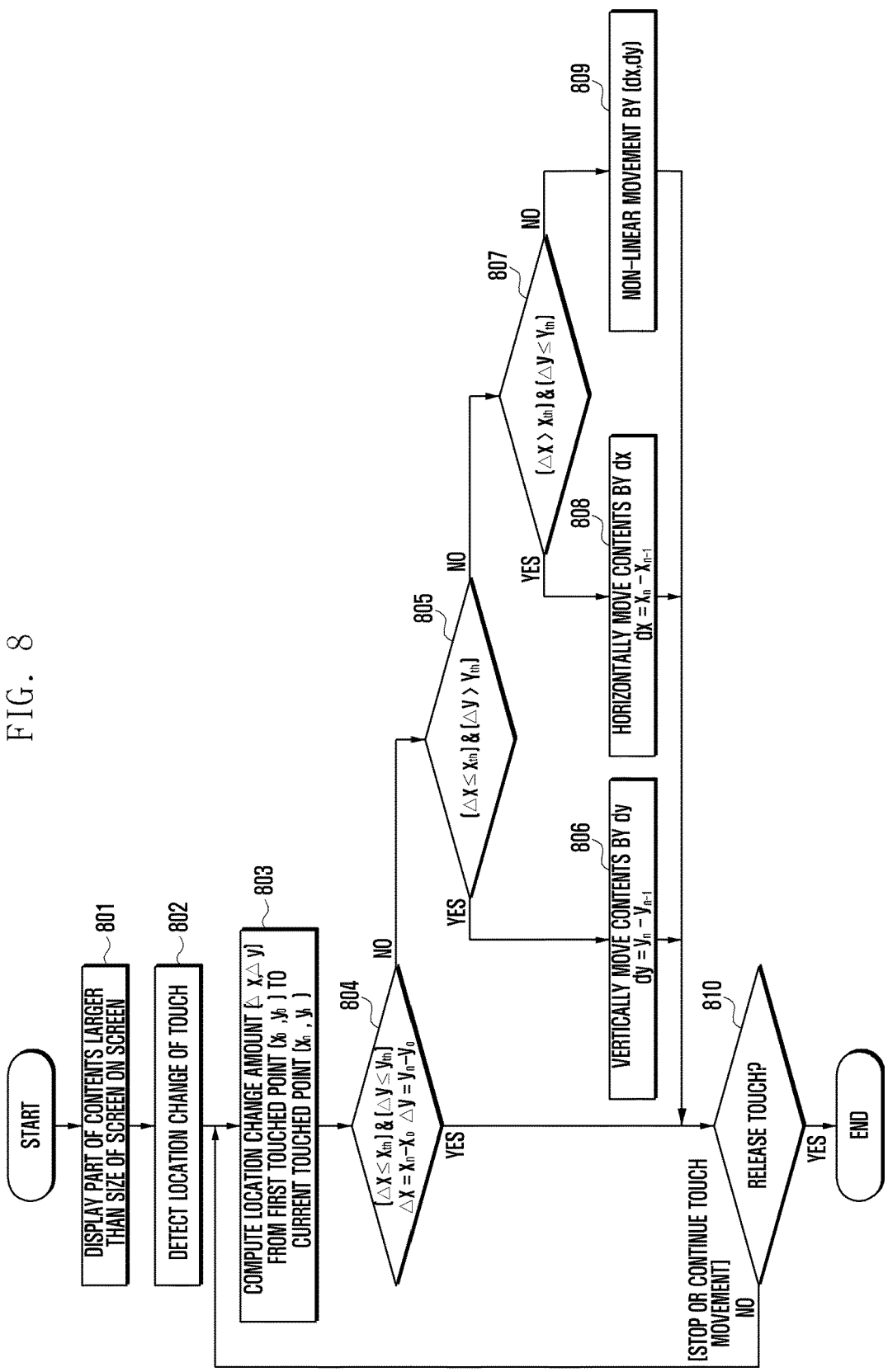
FIG. 8 is a flowchart illustrating a method for moving contents according to a first embodiment of the present invention.

FIG. 8 is a flowchart illustrating a method for moving contents according to a first embodiment of the present invention. At (801) a display unit 630 displays a part of contents whose size which is larger than that of a screen on the screen under control of a controller 670.

That is, the display unit displays a portion of a contents page that, at a current zoom level, cannot be simultaneously displayed in its entirety on the touch screen 610. The controller 670 detects location change of a touch with respect to the screen 610 (802). When the location change is detected, the controller 670 detects a current touched point $(x_n, y_n)$ (803). Here, there are various methods of accurately detecting the current touched point. For instance, the controller 670 may suitably sample and average a location value of an area of the touch input from the touch screen 610 to detect a current touched point. Further, the controller 670 computes a location change amount ($\Delta x$, $\Delta y$) from a starting point, namely, a first touched point $(x_0, y_0)$ to a current touched point $(x_n, y_n)$ (803). After that, as described in connection with FIG. 2, the controller 670 compares an X axis change amount ($\Delta x = x_n - x_0$) and a Y axis change amount ($\Delta y = y_n - y_0$) with a X axis threshold ($X_{th}$) and a Y threshold ($Y_{th}$), respectively.

The controller 670 determines whether $\Delta x$ and $\Delta y$ are less than or equal to the thresholds $X_{th}$ and $Y_{th}$, respectively (804). When $\Delta x$ and $\Delta y$ are less than or equal to the thresholds $X_{th}$ and $Y_{th}$, the controller 670 determines that no scroll occurs and the process proceeds to step 810. When $\Delta x$ and $\Delta y$ are greater than the thresholds $X_{th}$ and $Y_{th}$, the controller 670 determines that the scroll occurs and determines a direction of the scroll (805) in a non-linear direction.

The controller 670 determines whether $\Delta x$ is less than or equal to $X_{th}$ and $\Delta y$ exceeds $Y_{th}$. As the determination result, when $\Delta x$ is less than or equal to the $X_{th}$ and $\Delta y$ exceeds $Y_{th}$, the controller 670 determines a direction of the scroll as a vertical (Y axis) direction. Then, the controller 670 controls the display unit 630 to move the contents in the Y axis direction by $dy(=y_n-y_{n-1})$ (806), and the process proceeds to step 810, where it is determined if a touch release occurs. (Step 810 may be omitted in other embodiments). If touch is released, the process ends. Otherwise, in this embodiment, whether the drag movement stops or continues, the process returns to (803) where the drag motion continues to be monitored. For example, even if a release is detected, the controller 670 may maintain the scroll in the Y axis direction. When a command (e.g., tap) for stopping the scroll occurs, the controller 670 may stop the scroll. As the determination of step 805, when $\Delta x$ is greater than $X_{th}$, the process proceeds to step 807.

The controller 670 determines whether $\Delta x$ exceeds $X_{th}$ and $\Delta y$ is less than or equal to $Y_{th}$ (807). As the determination result, when $\Delta x$ exceeds the $X_{th}$ and $\Delta y$ is less than $Y_{th}$, the controller 670 determines the scroll direction as a horizontal (X axis) direction. Accordingly, the controller 670 controls the display unit 630 to move the contents in the horizontal (X axis) direction by $dx(=x_n-x_{n-1})$ (808), and the process proceeds to step 810. (Step 810 may be omitted in other embodiments).

As the determination result at step 807, when $\Delta y$ is greater than $Y_{th}$, that is, when both of $\Delta x$ and $\Delta y$ exceed the corresponding thresholds, respectively, the controller 670 determines a non-linear direction as the scroll direction. Accordingly, the controller 670 controls the display unit 630 to move the contents in the X axis direction by dz and in the Y axis direction by dy (809), and proceeds to step 810 (unless step 810 is omitted as indicated above).

At (810), controller 670 determines whether a release occurs; if so, the process is terminated. If no, when the scroll continues, that is, when touch movement continues or stops while touch contact is maintained, the controller 670 returns to step 803 and repeats the foregoing procedures for moving the contents.

According to the embodiment of the present invention illustrated with reference to FIG. 8, a starting point of scroll being a reference indicating whether scroll is beyond the threshold region maintains a first touched point regardless of the stop of the touch movement when the touch is not released. The stopped location may be reset as a starting point of the scroll.

Figure 9:
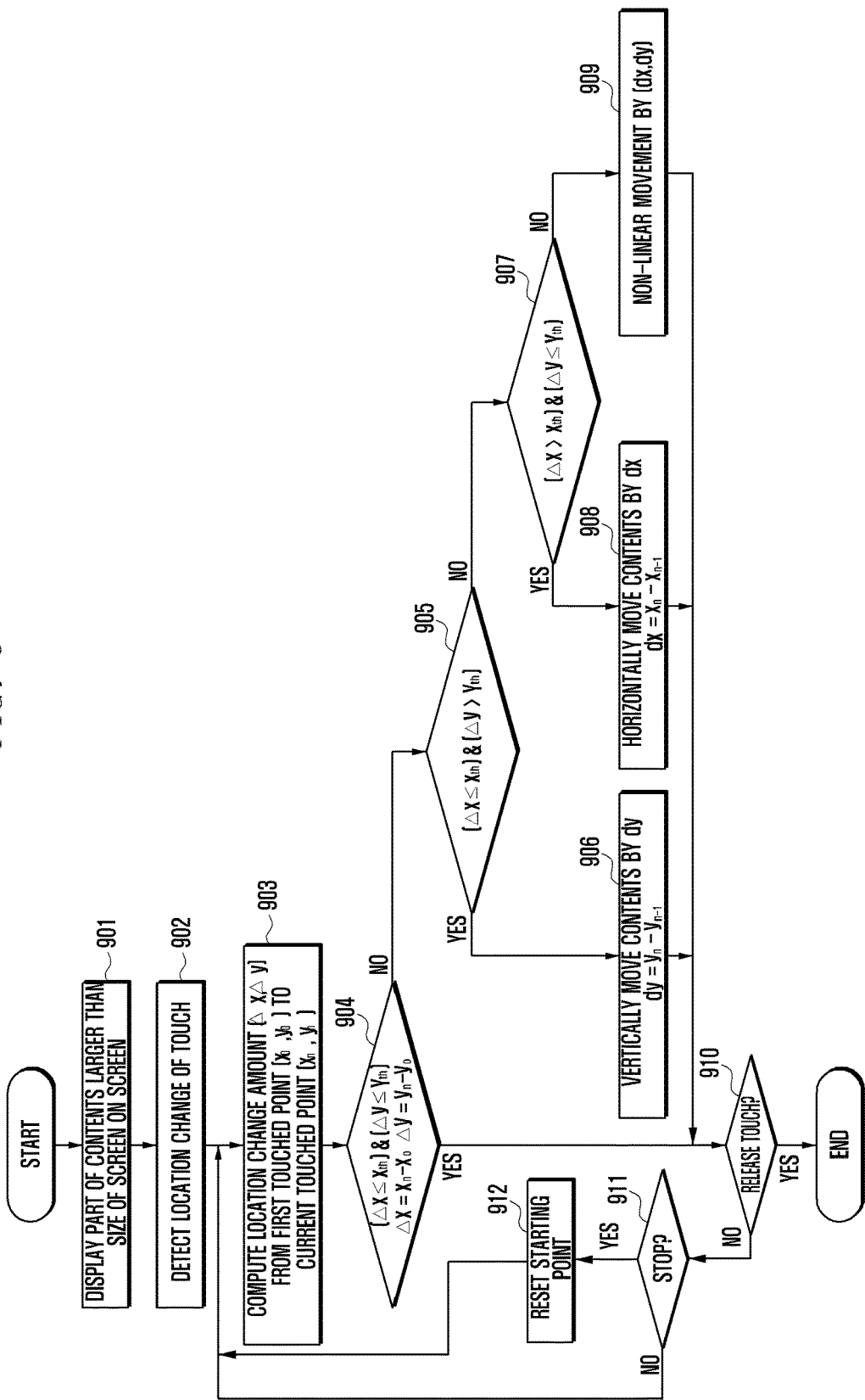
FIG. 9 is a flowchart illustrating a method for moving contents according to a second embodiment of the present invention.

FIG. 9 is a flowchart illustrating a method for moving contents according to a second embodiment of the present invention. This embodiment differs from that of FIG. 8 by distinguishing, after a scroll without a touch release (step 901), whether a drag continues moving or stops in a touch contact state. If a STOP is detected, X and Y thresholds (e.g., X and Y channel widths) are reset to initial values. Otherwise, no resetting occurs.

At (901), the display unit 630 displays a part of contents on a screen. The controller 670 detects location change of a touch with respect to a touch screen 610 (902). When the location change is detected, the controller 670 sets a starting point (903). The starting point may be a first touched point $(x_0, y_0)$ at the beginning. Further, when there is no location change of the touch in a current touched point $(x_n, y_n)$ for a predetermined time after movement of the touch, the controller 670 may reset the current touched point $(x_n, y_n)$ as the starting point. The controller 670 detects a current touched point $(x_n, y_n)$ (903). Further, the controller 670 computes a location change amount $(\Delta x, \Delta y)$ from a starting point to the current touched point $(x_n, y_n)$ (903). Next, the controller 670 compares an X axis change amount $\Delta x$ and a Y axis change amount $\Delta y$ with an X axis threshold $X_{th}$ and a Y axis threshold $Y_{th}$, respectively. The controller 670 determines whether $\Delta x$ and $\Delta y$ are less than or equal to the thresholds $X_{th}$ and $Y_{th}$, respectively (904). When $\Delta x$ and $\Delta y$ are less than or equal to the thresholds $X_{th}$ and $Y_{th}$, the controller 670 determines that no scroll occurs and the process proceeds to step 910. When at least one of $\Delta x$ and $\Delta y$ is greater than the respective thresholds $X_{th}$ and $Y_{th}$, the controller 670 determines that the scroll occurs and the process proceeds to step 905 to determine a direction of the scroll.

The controller 670 determines whether $\Delta x$ is less than or equal to the $X_{th}$ and $\Delta y$ exceeds the $Y_{th}$ (905). As the determination result, when $\Delta x$ is less than or equal to $X_{th}$ and $\Delta y$ exceeds $Y_{th}$, the controller 670 determines a direction of the scroll as a vertical (Y axis) direction. Then, the controller 670 controls the display unit 630 to move the contents in the Y axis direction by dy $(=y_n-y_{n-1})$ (906), and the process proceeds to step 910. As the determination of step 905, when $\Delta x$ is greater than $X_{th}$, the process proceeds to step 907.

The controller 670 determines whether $\Delta x$ exceeds $X_{th}$ and $\Delta y$ is less than or equal to $Y_{th}$ (907). As the determination result, when $\Delta x$ exceeds $X_{th}$ and $\Delta y$ is less than or equal to $Y_{th}$, the controller 670 determines the scroll direction as a horizontal (X axis) direction. Accordingly, the controller 670 controls the display unit 630 to move the contents in the horizontal (X axis) direction by dx$(=x_n-x_{n-1})$ (908) and a process proceeds to step 910.

As the determination result at step 907, when $\Delta y$ is greater than $Y_{th}$, that is, when both of $\Delta x$ and $\Delta y$ exceed the corresponding thresholds, respectively, the controller 670 determines a non-linear direction as the scroll direction. Accordingly, the controller 670 controls the display unit 630 to move the contents in the X axis direction by dz and in the Y axis direction by dy (909), and proceeds to step 910.

The controller 670 determines whether touch release occurs (910); if so, the process is terminated. If no, when the scroll continues, that is, when touch movement is performed or stops, the controller 670 returns to step 911. The controller 670 tracks a touched location to determine whether the touch stops (911). As the determination result, when the touch continues to move without stop, the process returns to step 903. Conversely, when the touch location is not changed for a predetermined time, the controller 670 resets a stopped location as an origin being a starting point of the scroll (912). The controller acquires a current location based on a reset origin, and performs procedures of determining presence of generation and a direction of the scroll based on the acquired current location.

Figure 10:
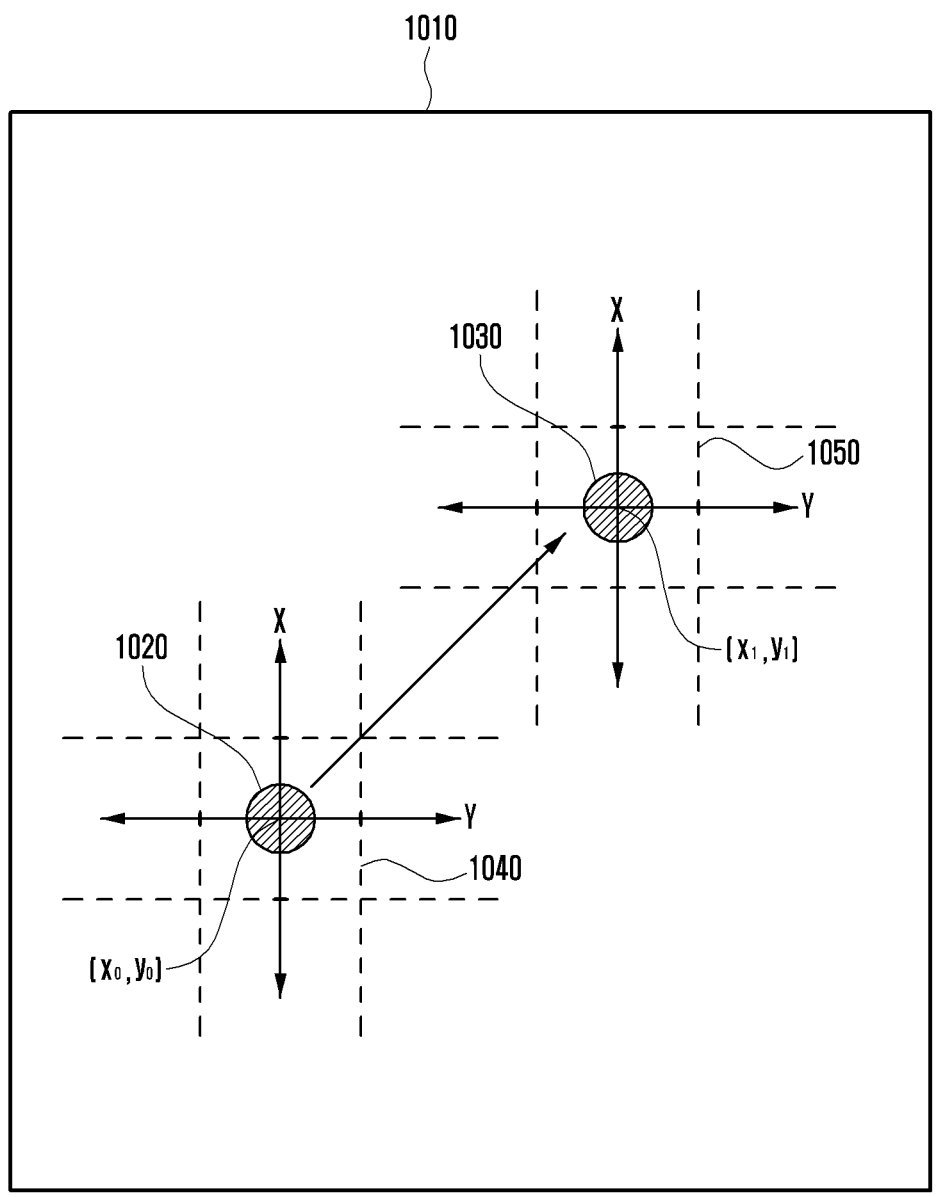
FIG. 10 is a conceptual diagram illustrating a procedure for resetting a starting point of a critical region.

FIG. 10 is a conceptual diagram illustrating a procedure for resetting a starting point of a touch point region on which to base subsequent contents movement. As illustrated, under the control of controller 670, a first point 1020 $(x_0, y_0)$ is set on a screen 1010 as a starting point, and a first threshold region 1040 is set based thereon. Next, when the touched location is moved to a second point 1030 $(x_1, y_1)$ and stops at that point, the second point 1030 $(x_1, y_1)$ is set as a new starting point and a second threshold region is set based on the second point 1030. Here, stopping at the second point 1030 can be determined by detecting either a cessation of touch contact at the second point, or, detection of stationary contact at the second point 1030 for a predetermined time. In the meantime, based on a time point $t_n$ when a current touched point is detected, the controller 670 may set a previous touched point detected at a previous time point $t_{n-1}$ as the starting point. A current threshold region may be set based on the previous touched point.

Figure 11:
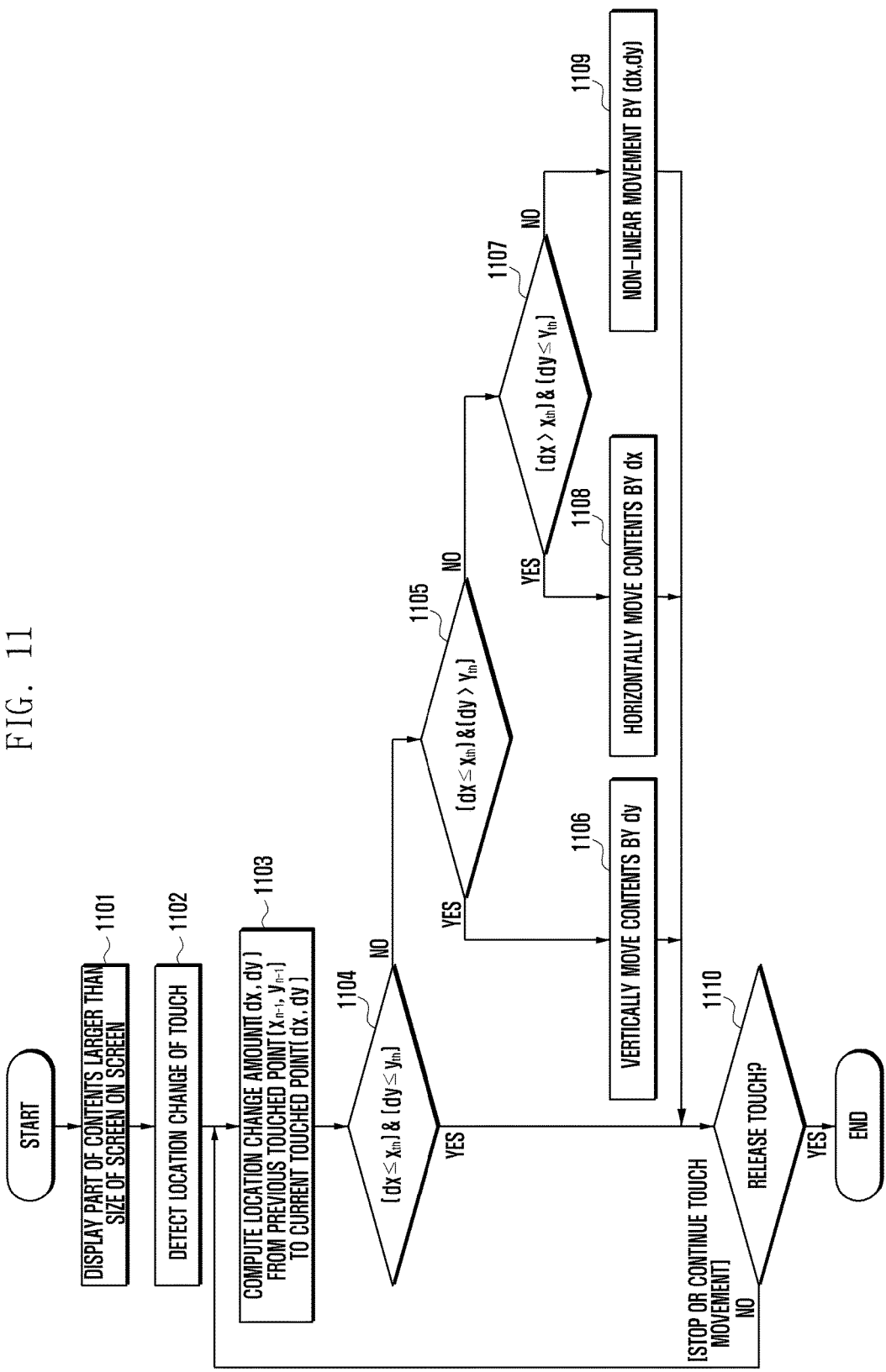
FIG. 11 is a flowchart illustrating a method for moving contents according to a third embodiment of the present invention.

FIG. 11 is a flowchart illustrating a method for moving contents according to a third embodiment of the present invention. Referring to FIG. 11, a display unit 630 displays a part of contents on a screen under control of a controller 670 (1101). The controller 670 detects location change of a touch with respect to a touch screen 610 (1102). When the location change is detected, the controller 670 detects a current touched point $(x_n, y_n)$ (1103). The controller 670 sets an immediately previous detected touch point $(x_{n-1}, y_{n-1})$ as the starting point (1103). The controller 670 computes a location change amount (dx, dy) from a previous touched point $(x_{n-1}, y_{n-1})$ to the current touched point $(x_n, y_n)$ (1103). After that, the controller 670 compare an X axis change amount dx and a Y axis change amount dy with an X axis threshold $X_{th}$ and a Y axis threshold $Y_{th}$, respectively.

The controller 670 determines whether both of dx and dy are less than or equal to corresponding thresholds, respectively (1104). When dx and dy are less than or equal to the thresholds $X_{th}$ and $Y_{th}$, the controller 670 determines that no scroll occurs and the process proceeds to step 1110. When at least one of dx and dy is greater than the respective thresholds $X_{th}$ or $Y_{th}$, the controller 670 determines that the scroll occurs and the process proceeds to step 1105 to determine a direction of the scroll.

The controller 670 determines whether dx is less than or equal to $X_{th}$ and dy exceeds $Y_{th}$ (1105). As the determination result, when $\Delta x$ is less than or equal to $X_{th}$ and dy exceeds $Y_{th}$, the controller 670 determines a direction of the scroll as a vertical (Y axis) direction. Then, the controller 670 controls the display unit 630 to move the contents in the Y axis direction by dy (1106), and the process proceeds to step 1110. As the determination of step 1105, when dx is greater than $X_{th}$, the process proceeds to step 1107.

The controller 670 determines whether dx exceeds $X_{th}$ and dy is less than or equal to the $Y_{th}$ (1107). As the determination result, when dx exceeds $X_{th}$ and dy is less than $Y_{th}$, the controller 670 determines the scroll direction as a horizontal (X axis) direction. Accordingly, the controller 670 controls the display unit 630 to move the contents in the horizontal (X axis) direction by dx (1108) and the flow proceeds to step 1110.

As the determination result at step 1107, when dy is greater than $Y_{th}$, that is, when both of dx and dy exceed the corresponding thresholds, respectively, the controller 670 determines a non-linear direction as the scroll direction. Accordingly, the controller 670 controls the display unit 630 to move the contents in the X axis direction by dx and in the Y axis direction by dy (1109), and proceeds to step 1110.

The controller 670 determines whether a touch release occurs (1110); if so, the process is terminated. If not, that is, when drag movement continues or stops, the controller 670 returns to step 1103 and repeats the foregoing procedures for moving the contents.

When the scroll starts, the controller 670 may enlarge the threshold region in stages to maintain the scroll in an initial preset direction. To achieve this, the controller 670 may include components as illustrated in FIG. 12.

Figure 12:
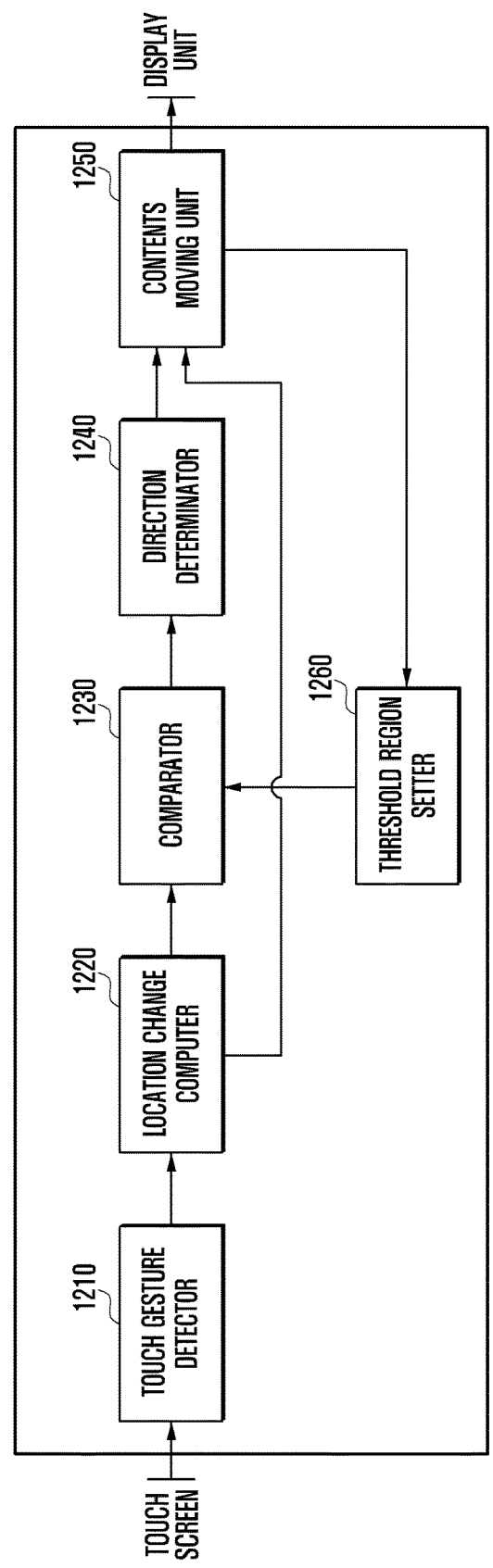
FIG. 12 is a block diagram illustrating a configuration of a controller according to another embodiment of the present invention.

FIG. 12 is a block diagram illustrating a configuration of a controller according to another embodiment of the present invention. The controller 670 may include a touch gesture detector 1210, a location change computer 1220, a comparator 1230, a direction determinator 1240, a contents moving unit 1250, and a threshold region setter 1260.

The touch gesture detector 1210 is connected to the touch screen 610, receives a touch event from the touch screen 610, and detects a touch gesture of the user from the received touch event. That is, the touch gesture detector 1210 may detector a touched point, a moving distance of a touch, a moving direction of the touch, and speed of the touch. The location change computer 1220 receives touch information associated with a touch gesture from the touch gesture detector 1210, and computes a location change amount from a starting point to a current touched point, namely, an X axis change amount dx or $\Delta x$ and a Y axis change amount dy or $\Delta y$ based on the received touch information. The comparator 1230 compares the X axis change amount and the Y axis change amount with an X axis threshold and a Y axis threshold, respectively. The direction determinator 1240 determines a moving direction of the touch based on the comparison result of the comparator 1230. The contents moving unit 1250 moves the contents in a direction determined by the direction determinator 1240 and controls the display unit 630 to display a corresponding part of the moved contents. When the movement of the contents starts, the threshold region setter 1260 enlarges the threshold region. For example, in a case of a smart phone whose screen size is 4 inches, when the size of an initial threshold region is 32 pixels and movement of the contents starts, the threshold region may be enlarged to 128 pixels. Further, the threshold region setter 1260 transfers information of the enlarged threshold region to the comparator 1230. The threshold region setter 1260 may reduce the threshold region. For example, when the scroll stops, the enlarged threshold region may be reduced. Further, when the scroll starts, the threshold region may be reduced greater than an initial preset size. An operation of the controller 670 having the components as illustrated in FIG. 12 will be described with reference to FIGS. 13 to 20.

Figure 13:
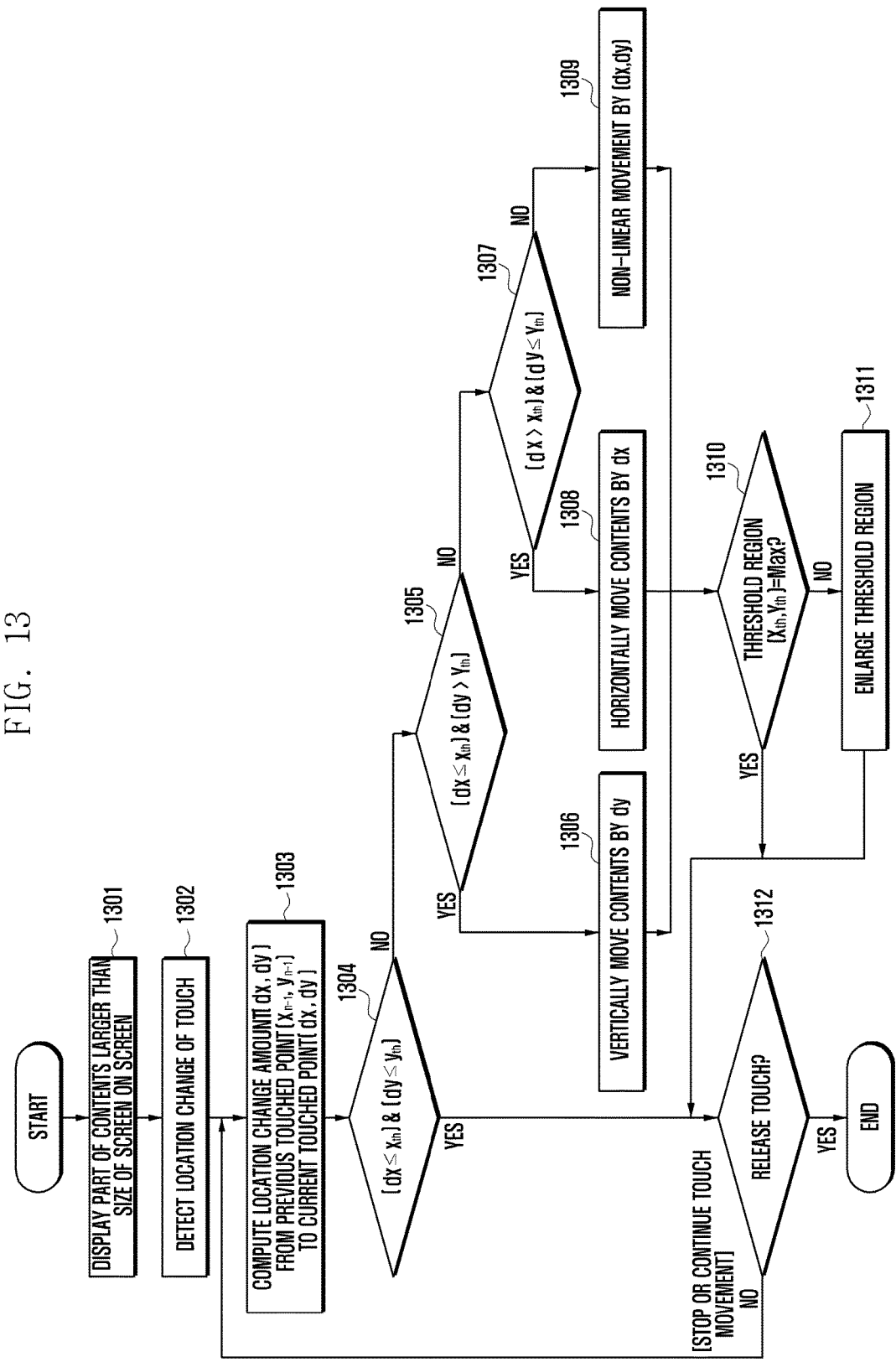
FIG. 13 is a flowchart illustrating a method for moving contents according to a fourth embodiment of the present invention.

FIG. 13 is a flowchart illustrating a method for moving contents according to a fourth embodiment of the present invention. Referring to FIG. 13, a display unit 630 displays a part of contents larger than the size of a screen on the screen under control of a controller 670 (1301). The controller 670 detects location change of a touch with respect to a touch screen 610 (1302). When the location change is detected, the controller 670 detects a current touched point $(x_n, y_n)$ (1303). The controller 670 sets an immediately previous detected touch point $(x_{n-1}, y_{n-1})$ as the starting point (1303). The controller 670 computes a location change amount (dx, dy) from a previous touched point $(x_{n-1}, y_{n-1})$ to the current touched point $(x_n, y_n)$ (1303). After that, the controller 670 compares an X axis change amount dx and a Y axis change amount dy with an X axis threshold $X_{th}$ and a Y axis threshold $Y_{th}$, respectively.

The controller 670 determines whether both of dx and dy are less than or equal to corresponding thresholds, respectively (1304). If so, the controller 670 determines that no scroll occurs and the process proceeds to step 1312. When at least one of dx and dy is greater than the respective thresholds $X_{th}$ and $Y_{th}$, the controller 670 determines that the scroll occurs and the process proceeds to step 1305 to determine a direction of the scroll.

The controller 670 determines whether the dx is less than or equal to the $X_{th}$ and the dy exceeds the $Y_{th}$ (1305). As the determination result, when $\Delta x$ is less than or equal to $X_{th}$ and dy exceeds $Y_{th}$, the controller 670 determines a direction of the scroll as a vertical (Y axis) direction. Then, the controller 670 controls the display unit 630 to move the contents in the Y axis direction by dy (1306), and the process proceeds to step 1310. As the determination of step 1305, when the dx is greater than the $X_{th}$, the process proceeds to step 1307.

The controller 670 determines whether dx exceeds $X_{th}$ and dy is less than or equal to $Y_{th}$ (1307). As the determination result, when dx exceeds $X_{th}$ and dy is less than $Y_{th}$, the controller 670 determines the scroll direction as a horizontal (X axis) direction. Accordingly, the controller 670 controls the display unit 630 to move the contents in the horizontal (X axis) direction by dx (1308) and the flow proceeds to step 1310.

As the determination result at step 1307, when dy is greater than $Y_{th}$, that is, when both of dx and dy exceed the corresponding thresholds, respectively, the controller 670 determines a non-linear direction as the scroll direction. Accordingly, the controller 670 controls the display unit 630 to move the contents in the X axis direction by dx and in the Y axis direction by dy (1309), and proceeds to step 1310.

The controller 670 determines whether a current set size of a threshold region is a preset maximum value Max (1310). For example, in a case of a smart phone whose screen size is 4 inches, the maximum value may be 128 pixels. When the current set size of a threshold region is the preset maximum value Max, the process proceeds to step 1312. If not, the controller 670 enlarges the threshold region (1311) and proceeds to step 1312. For example, when the current set size of a threshold region is 32 pixel (horizontal*vertical(4*8)), the controller 670 enlarges a horizontal side and a vertical size of the threshold region twice, namely, 128 pixels (horizontal*vertical(8*16)).

The controller 670 determines whether a touch release occurs (1312); if so, the process is terminated. If not, when the scroll continues, that is, when touch movement continues or stops, the controller 670 returns to step 1303 and repeats the foregoing procedures for moving the contents.

According to the fourth embodiment of the present invention illustrated with reference to FIG. 13, a starting point of scroll being a reference indicating whether scroll is beyond the threshold region maintains a first touched point regardless of the stop of the touch movement when the touch is not released. The stopped location may be reset as a starting point of the scroll. According to the fourth embodiment of the present invention illustrated with reference to FIG. 13, when the scroll starts, the controller 670 enlarges a threshold region to maintain the scroll in an initial set direction. As illustrated previously, the threshold region is enlarged once or more. In a case of a smart phone whose screen size is 4 inches, the threshold region may be enlarged only once when the scroll starts. In a case of a tablet PC whose screen size is 10 inches, the threshold region may be enlarged twice, that is, when the scroll starts and a direction of the scroll is a vertical (Y axis) direction and an X axis change amount dx exceeds 32 pixels. That is, the maximum number of a threshold region to be enlarged may be determined according to the size of the screen. The determination factor is not limited to the size of the screen. That is, the determination factor may include resolution, a touch sensitivity of the touch screen 610, a touch type of the touch screen 610, and an experimental result (e.g., pattern information associated with touching habits of the user).

Figure 14:
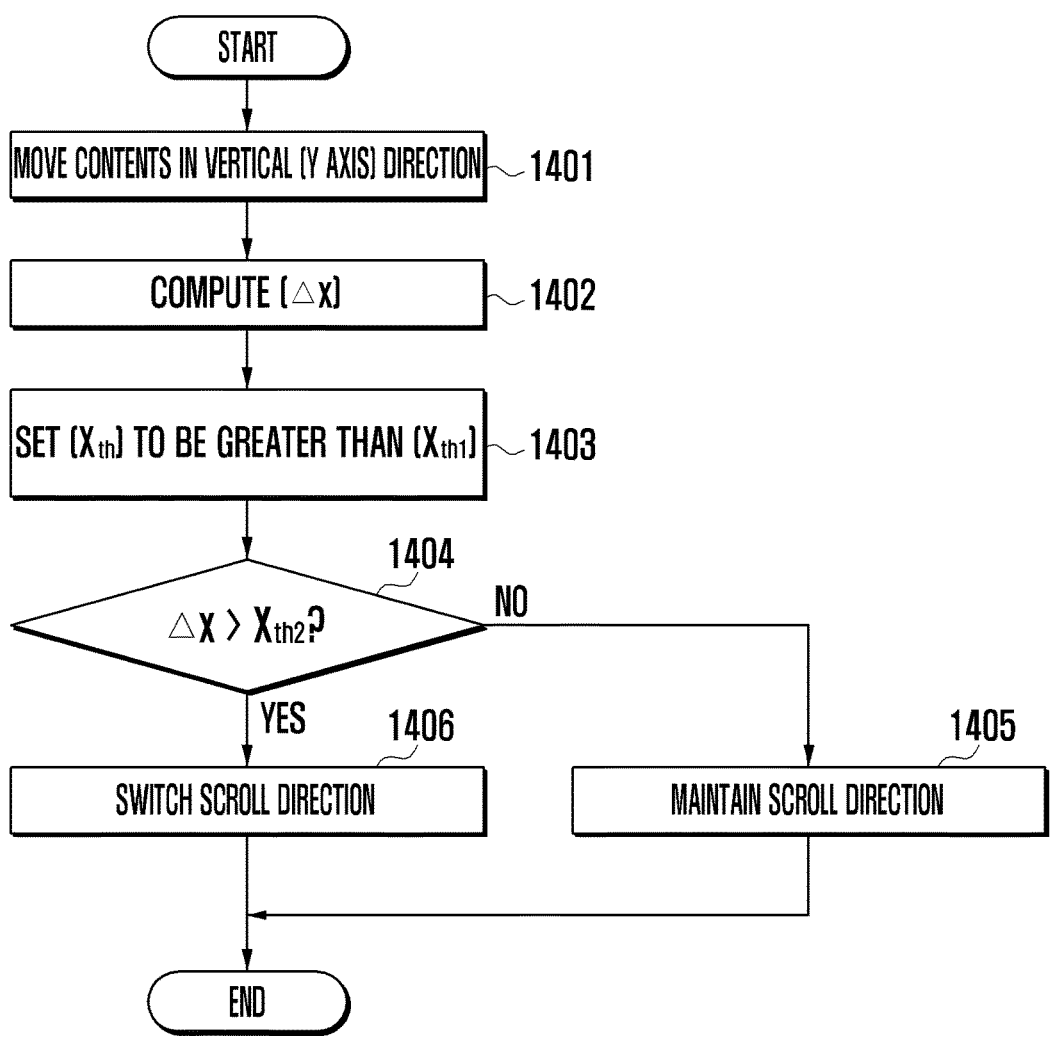
FIGS. 14 and 15 are diagrams illustrating a vertical scroll method according to an exemplary embodiment of the present invention.
Figure 15:
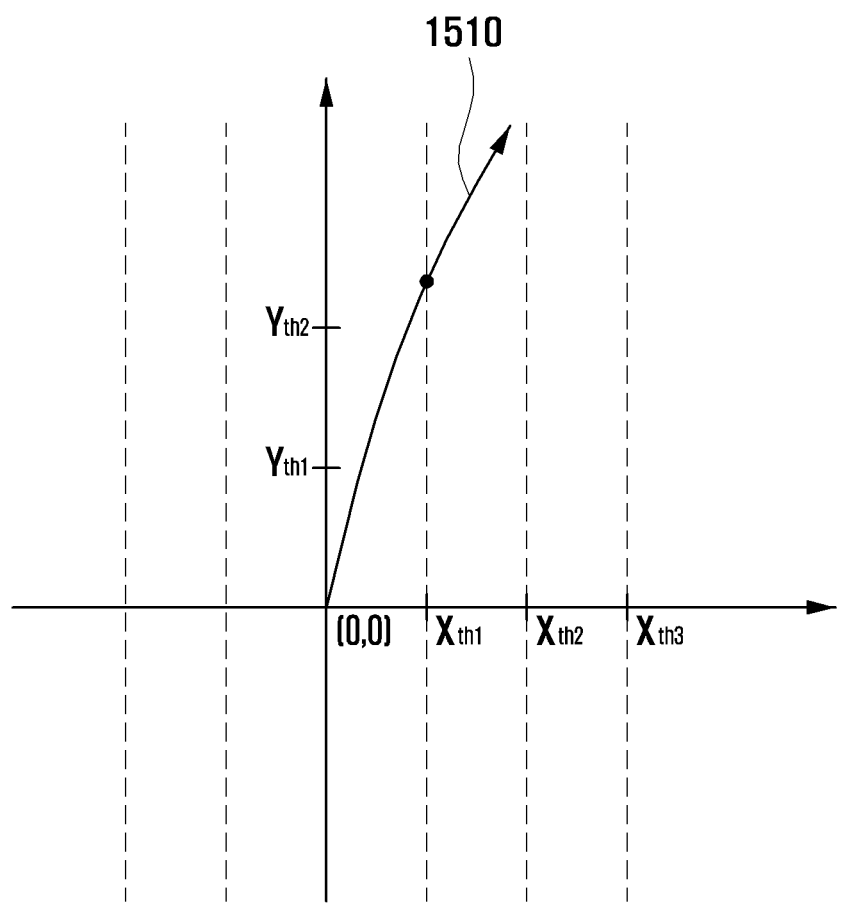

FIGS. 14 and 15 are diagrams illustrating a vertical scroll method according to an exemplary embodiment of the present invention.

Referring to FIGS. 14 and 15, a user has intent to scroll contents in a vertical (Y axis) direction. However, a touch gesture (typically a drag movement) of the user is unintentionally in a parabola direction 1510 as illustrated in FIG. 15. The present embodiment recognizes this error and controls scroll movement to be in the Y direction despite the slight parabolic drag.

The controller 670 detects a touch gesture from a touch event received from the touch screen 610, and computes a location change amount from a starting point (0, 0) to a current touched point, namely, an X axis change amount ($\Delta x = x_n - x_0$) and a Y axis change amount ($\Delta y = y_n - y_0$). Further, the controller 670 compares the computed $\Delta x$ and $\Delta y$ with a first axis threshold $X_{th1}$ and a first Y axis threshold $Y_{th1}$. As the comparison, when $\Delta x$ is less than $X_{th1}$ and $\Delta y$ is greater than $Y_{th1}$, the controller 670 moves the contents in a vertical (Y axis) direction (1401). After that, i.e., at the point that the Yth threshold is breached, the controller 670 begins another iteration to again compute $\Delta x$ (1402) and $\Delta y$ from the starting point 0,0 to the current point. At the same time, controller 670 resets the X axis threshold value to a value to $X_{th2}$ which is greater than the initial value $X_{th1}$ (1403). (This resetting of the X axis threshold is equivalent to widening an initial Y channel as discussed earlier in connection with FIG. 2.) At this point, the controller 670 compares $\Delta x$ with the second X axis threshold $X_{th2}$.

As the touch gesture continues, the controller 670 continues to monitor the touch contact movement point, i.e., the current point, and determines whether $\Delta x$ measured from the starting point 0,0 is greater than the second X axis threshold $X_{th2}$ (1404). When $\Delta x$ is less than or equal to $X_{th2}$, the controller 670 maintains a direction of the scroll as the vertical direction (1405). That is, as illustrated in FIG. 15, an actually detected drag direction is a parabola direction 1510 but the controller 670 scrolls the contents in a Y axis direction. When $\Delta x$ is greater than the second threshold $X_{th2}$, the controller 670 switches the scroll direction to a non-linear direction (1406).

Referring to FIG. 15, when the X axis threshold is increased from $X_{th1}$ to $X_{th2}$ ($X_{th2} > X_{th1}$), the Y axis threshold is also increased from $Y_{th1}$ to $Y_{th2}$ ($Y_{th2} > Y_{th1}$). For example, when the Y axis change amount $\Delta y$ measured from the starting point (0,0) exceeds $Y_{th2}$, the X axis threshold may be again increased from $X_{th2}$ to a third X axis threshold, namely, $X_{th3}$ ($X_{th3} > X_{th2}$). Thus, the Y channel is again widened to accommodate the continued unintentional parabolic drag movement.

Figure 16:
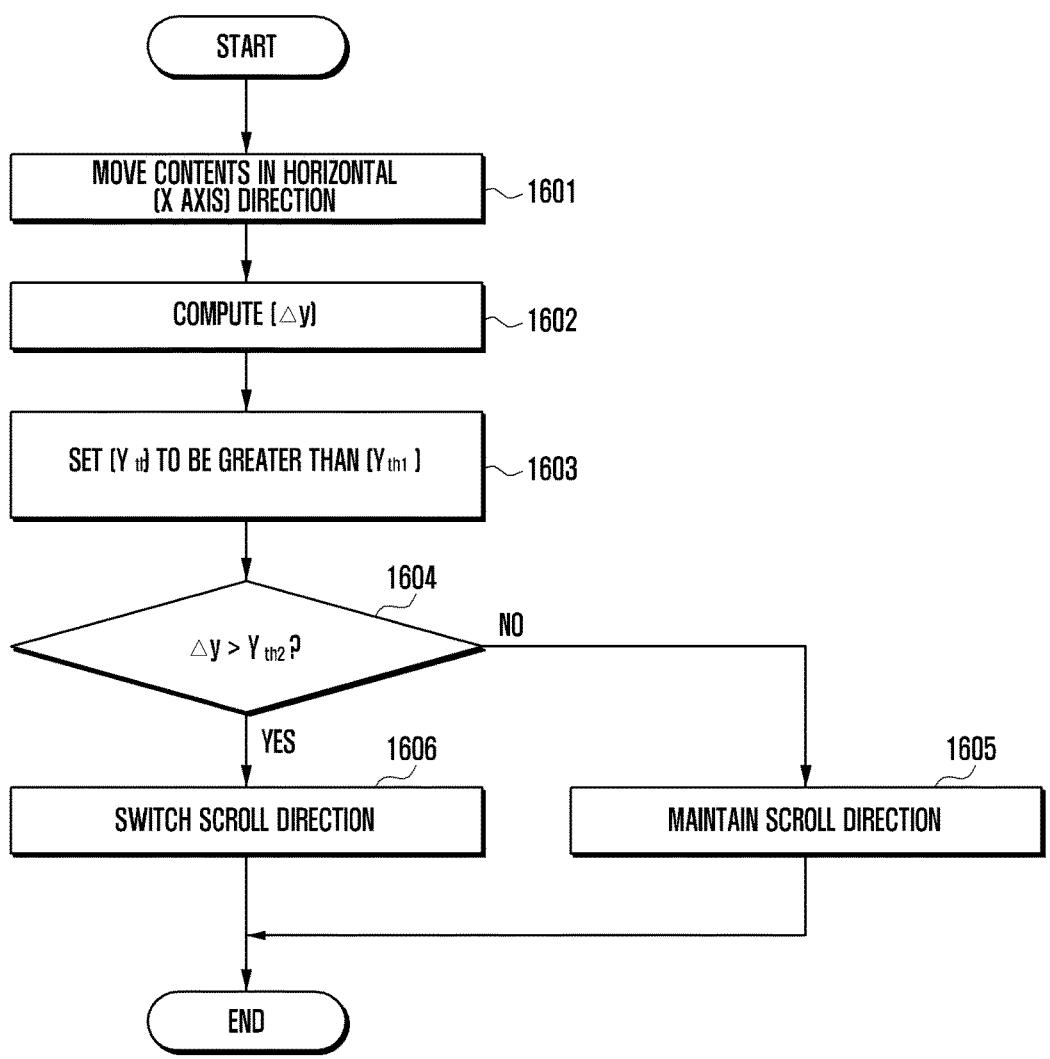
FIGS. 16 and 17 are diagrams illustrating a horizontal scroll method according to another embodiment of the present invention.
Figure 17:
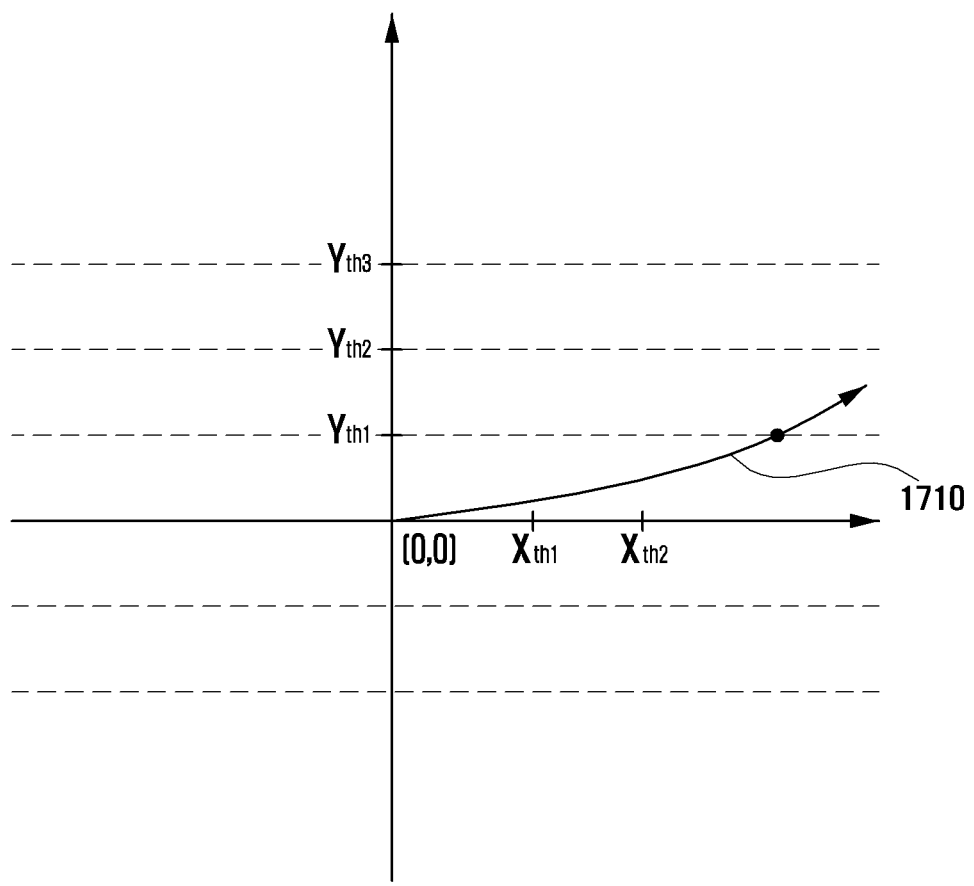

FIGS. 16 and 17 are diagrams illustrating a horizontal scroll method according to an exemplary embodiment of the present invention. Referring to FIGS. 16 and 17, a user has intent to scroll contents in a horizontal (X axis) direction. However, a touch gesture (typically a drag movement) of the user is unintentionally in a parabola direction 1710 as illustrated in FIG. 17. The present embodiment recognizes this error and controls scroll movement to be in the X direction despite the slight parabolic drag. The controller 670 detects a touch gesture from a touch event received from the touch screen 610, and computes a location change amount from a starting point (0, 0) to a current touched point, namely, an X axis change amount ($\Delta x = x_n - x_0$) and a Y axis change amount ($\Delta y = y_n - y_0$). Further, the controller 670 compares the computed $\Delta x$ and $\Delta y$ with a first axis threshold $X_{th1}$ and a first Y axis threshold $Y_{th1}$. As the comparison, when $\Delta x$ is greater than $X_{th1}$ and $\Delta y$ is less than $Y_{th1}$, the controller 670 moves the contents in a horizontal (X axis) direction (1601). After that, i.e., at the point that the Xth threshold is breached, the controller 670 begins another iteration to again compute $\Delta x$ and $\Delta y$ from the starting point 0,0 to the current point (1602). At the same time, the controller 670 resets the Y axis threshold value to $Y_{th2}$ which is greater than the initial value $Y_{th1}$ (1603). This resetting of the Y axis threshold is equivalent to widening an initial X channel as discussed in connection with FIG. 2. At this point, the controller 670 compares $\Delta y$ with the second Y axis threshold $Y_{th2}$.

As the touch gesture continues, controller 670 continues to monitor the touch contact movement and determines whether $\Delta y$ measured from the starting point 0,0 is greater than the second Y axis threshold $Y_{th2}$ (1604). When $\Delta y$ is less than or equal to the second Y axis threshold $Y_{th2}$, the controller 670 maintains a direction of the scroll as the horizontal direction (1605). That is, as illustrated in FIG. 17, an actually detected drag direction is a parabola direction 1710 but the controller 670 scrolls the contents in an X axis direction. When $\Delta y$ is greater than the second threshold $Y_{th2}$, the controller 670 switches the scroll direction to a non-linear direction (1606).

Referring to FIG. 17, when the Y axis threshold is increased from $Y_{th1}$ to $Y_{th2}$ ($Y_{th2} > Y_{th1}$), the X axis threshold is also increased from the $X_{th1}$ to $X_{th2}$ ($X_{th2} > X_{th1}$). For example, when the X axis change amount $\Delta x$ measured from the starting point 0,0 exceeds $X_{th2}$, the Y axis threshold may be again increased from the $Y_{th2}$ to a third Y axis threshold, namely, $Y_{th3}$ ($Y_{th3} > Y_{th2}$). This increases the X channel again to accommodate the continued unintentional parabolic drag movement.

Figure 18:
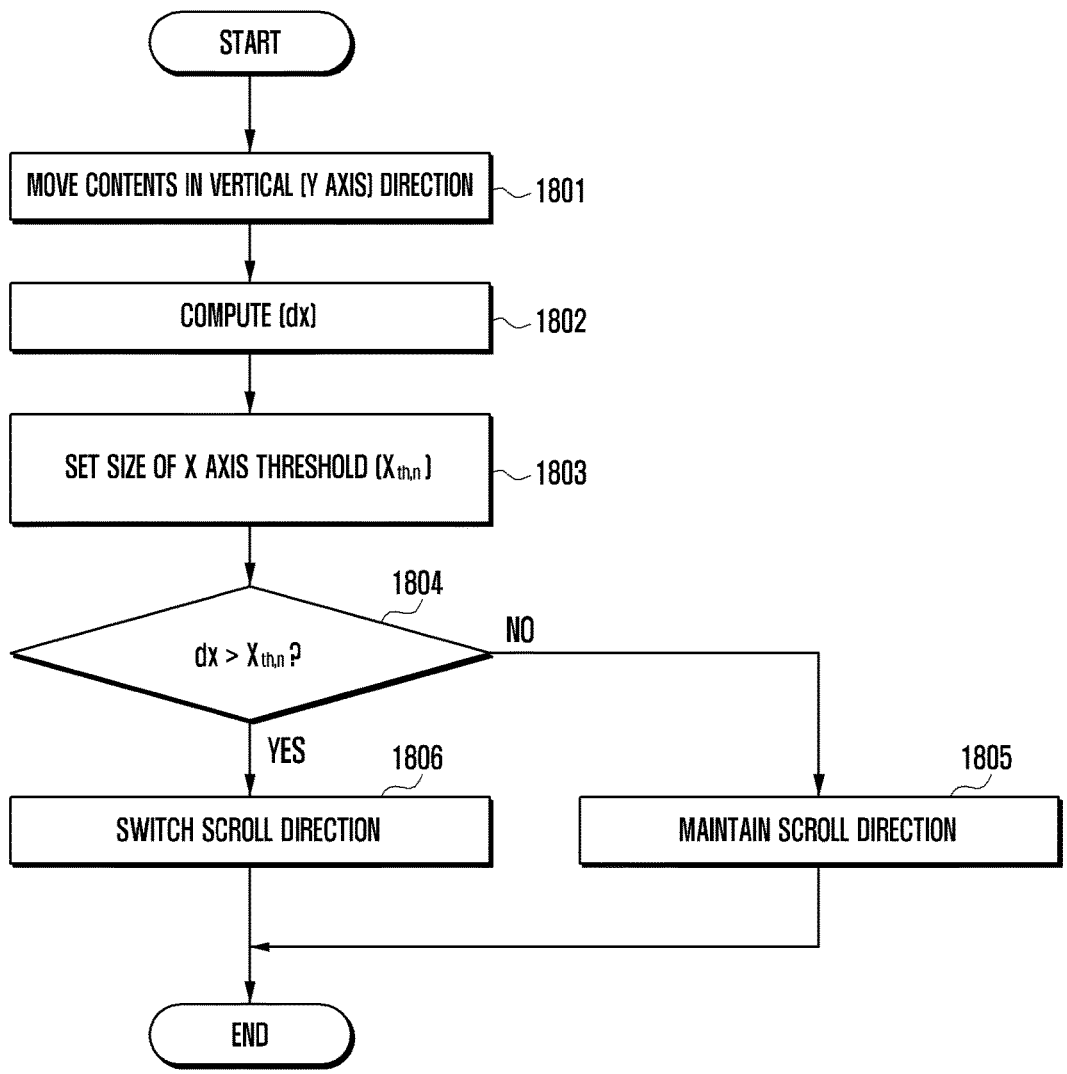
FIGS. 18 and 19 are diagrams illustrating a vertical scroll method according to another embodiment of the present invention.
Figure 19:
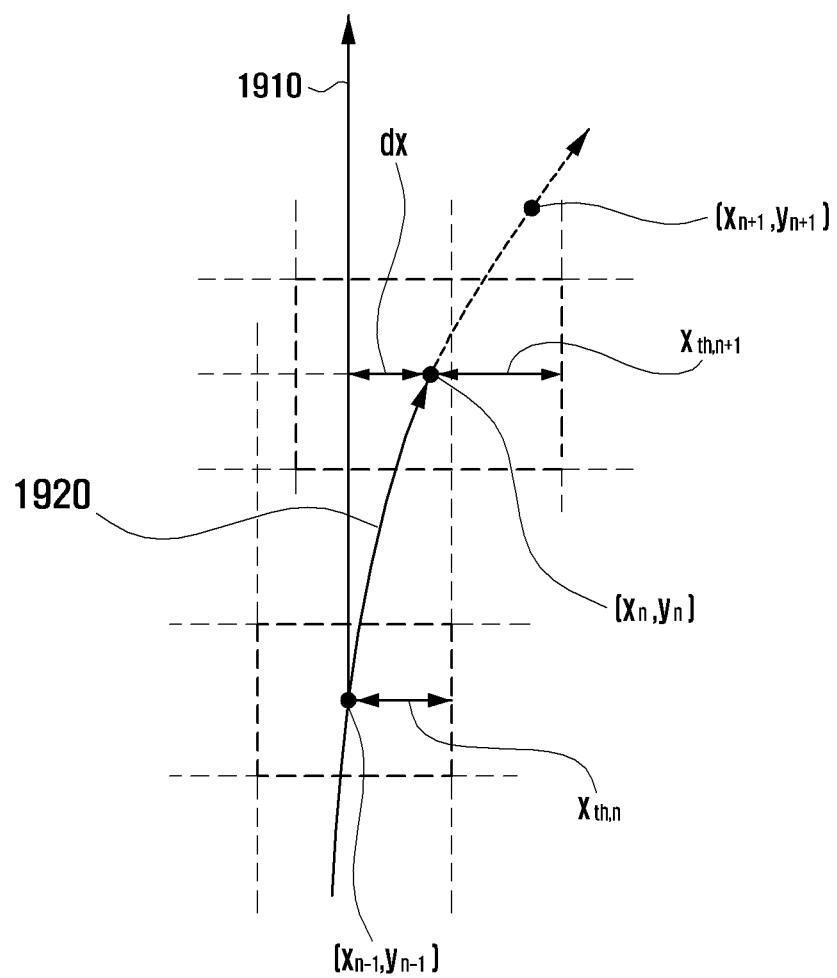

FIGS. 18 and 19 are diagrams illustrating a vertical scroll method according to another embodiment of the present invention. Referring to FIGS. 18 and 19, a controller 670 moves contents in a vertical direction 1910 (1801). The controller 670 computes an X change amount ($dx = x_n - x_{n-1}$) in a current time point $t_n$ (1802). The controller 670 sets a first X axis threshold $X_{th,n}$ based on a starting point, namely, a previous touched point ($x_{n-1}$, $y_{n-1}$) (1803). Here, the size of the first X axis threshold $X_{th,n}$ may be greater or less than a previously set value $X_{th,n-1}$. Meanwhile, the size of the first X axis threshold $X_{th,n}$ remains without change. Further, the controller 670 compares a first X axis threshold $X_{th,n}$ with a dx (1803).

The controller 670 determines whether dx is greater than the first X axis threshold $X_{th,n}$ (1804). When dx is less than or equal to the first X axis threshold $X_{th,n}$, the controller 670 maintains a direction of the scroll as the vertical direction (1805). That is, as illustrated in FIG. 19, an actually detected touch gesture (e.g., drag) direction in a current time point $t_n$ is a parabola direction 1920 but the controller 670 scrolls the contents in a vertical direction. When dx is greater than the first X axis threshold $X_{th,n}$, the controller 670 switches the scroll direction to a non-linear direction (1806).

Referring to FIG. 19, when a next time point $t_{n+1}$ comes, the controller 670 detects a next touched point $(x_{n+1}, y_{n+1})$ and sets a second X axis threshold $(X_{th,n+1})$ based on a starting point $(x_n, y_n)$. Here, the second X axis threshold $(X_{th,n+1})$ may be greater or less than a previous value $X_{th,n}$. Meanwhile, the size of the second X axis threshold $X_{th,n+1}$ remains without change.

Figure 20:
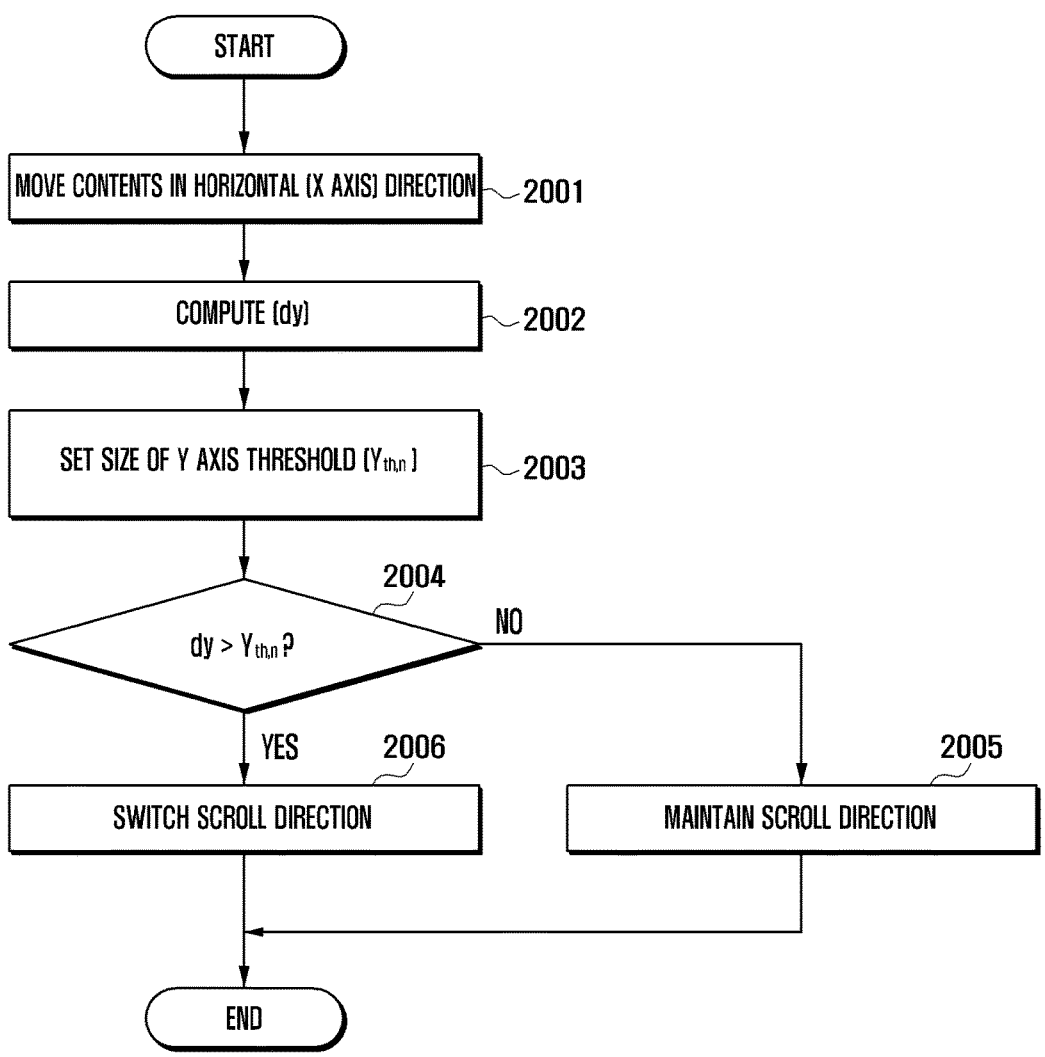
FIG. 20 is a diagram illustrating a horizontal scroll method according to another embodiment of the present invention.

FIG. 20 is a diagram illustrating a horizontal scroll method according to another embodiment of the present invention. At (2001), controller 670 moves contents in a horizontal direction. The controller 670 computes a Y change amount $(dy=y_n-y_{n-1})$ in a current time point $t_n$ (2002). The controller 670 sets a first Y axis threshold $Y_{th,n}$ based on a starting point, namely, a previous touched point $(x_{n-1}, y_{n-1})$ (2003). Here, the size of the first Y axis threshold $Y_{th,n}$ may be greater or less than a previously set value $Y_{th,n-1}$. Meanwhile, the size of the first Y axis threshold $Y_{th,n}$ remains without change. Further, the controller 670 compares a first Y axis threshold $Y_{th,n}$ with dy (2003).

The controller 670 determines whether dy is greater than the first Y axis threshold $Y_{th,n}$ (2004). When dy is less than or equal to the first Y axis threshold $Y_{th,n}$, the controller 670 maintains a direction of the scroll as the horizontal direction (2005). When dy is greater than the first Y axis threshold $Y_{th,n}$, the controller 670 switches the scroll direction to a non-linear direction (2006). When a next time point $t_{n+1}$ comes, the controller 670 detects a next touched point $(x_{n+1}, y_{n+1})$ and sets a second Y axis threshold $(Y_{th,n+1})$ based on a starting point $(x_n, y_n)$. Here, the second Y axis threshold $(Y_{th,n+1})$ may be greater or less than a previous value $Y_{th,n}$. Meanwhile, the size of the second Y axis threshold $Y_{th,n+1}$ remains without change.

Since structural components can be variously changed according to the convergence trend of digital devices, unnecessary detailed structure of the various components have not been set forth herein. However, the portable terminal 600 according to the present invention may further include components which are not mentioned above such as a GPS module, a vibration mode, an acceleration sensor, and so forth. The portable terminal 600 of the present invention may be substituted by specific constructions in the foregoing arrangements according to the provided form.

The foregoing method for moving contents of the present invention may be implemented in an executable program command form by various computer means and be recorded in a computer readable recording medium. In this case, the computer readable recording medium may include a program command, a data file, and a data structure individually or a combination thereof. Program command instructions recorded in a recording medium may be specially designed or configured for the present invention or be known to a person having ordinary skill in a computer software field to be used.

The computer readable recording medium may be Magnetic Media such as hard disk, floppy disk, or magnetic tape, Optical Media such as Compact Disc Read Only Memory (CD-ROM) or Digital Versatile Disc (DVD), Magneto-Optical Media such as optical disk, and a hardware device such as ROM. RAM, flash memory storing and executing program commands. Further, the program command includes a machine language code created by a complier and a high-level language code executable by a computer using an interpreter. The foregoing hardware device may be configured to be operated as at least one software module to perform an operation of the present invention.

As mentioned above, in the moving and the apparatus for moving contents according to the present invention, contents can be moved and display in a predetermined linear direction intended by the user despite the detection of an unintentional nonlinear touch gesture movement.

Although the method and the apparatus for moving contents according to exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. An electronic device comprising:
   a touch screen for displaying contents and generating a touch event in response to a touch gesture with respect to the displayed contents; and
   a controller for controlling movement of the displayed contents based on the touch event generated by the touch screen, the controller configured to:
      establish an initial threshold region surrounding an initial touch point, the initial threshold region bounded by an intersection of an X channel and a Y channel, each having a respective uniform width;
      detect a drag movement from the initial touch point;
      maintain the contents at a current position if the detected drag movement moves to a touch point within the initial threshold region;
      move the contents if the detected drag movement moves from the initial touch point to a second touch point outside the initial threshold region, such that if the second touch point is disposed within the X or Y channel, the contents are moved in an X or Y direction, respectively;
      in response to detecting a continued movement of the detected drag movement from the initial touch point inside the initial threshold region to the second touch point outside the initial threshold region, expand the initial threshold region by increasing the uniform width of the X or Y channel within which the continued movement of the detected drag movement occurs, so as to maintain a continued movement of the contents in an initially set direction;
      after the initial threshold region is expanded, if the second touch point was within the X channel, move the contents further in the X direction when the drag movement continues anywhere within the X channel in a direction having an X-axis component, and if the second touch point was within the Y channel, move the contents further in the Y direction when the drag movement continues anywhere within the Y channel in a direction having a Y-axis component; and
      move the contents in the direction of the detected drag movement, if the second touch point is disposed outside both, the X and Y channels.

2. The electronic device of claim 1, wherein if the second touch point is disposed within the X channel and outside the Y channel, the contents are moved in the X direction excluding any movements in the Y direction;
   wherein if the second touch point is disposed within the Y channel and outside the X channel, the contents are moved in the Y direction excluding any movements in the X direction; and
   wherein if the second touch point is disposed outside both the X and Y channels, the contents are moved according to a direction of the drag movement.

3. The electronic device of claim 1, wherein after the initial threshold region is expanded, the contents are moved in the direction of the drag movement if the drag movement breaches the expanded initial threshold region, the controller further configured to:
   in response to detecting termination of the continued movement of the detected drag movement, reset the expanded initial threshold region to an original width.

4. The electronic device of claim 1, wherein:
   the initial threshold region is bounded by a first X axis threshold and a first Y axis threshold;
   the initial threshold region is expanded by defining a second X axis threshold higher than the first X axis threshold when the drag movement is within the Y channel, and the second X axis threshold is set to a third X axis threshold higher than the second X axis threshold following additional drag movement according to a criteria; and
   the initial threshold region is expanded by defining a second Y axis threshold higher than the first Y axis threshold when the drag movement is within the X channel, and the second Y axis threshold is reset to a third Y axis threshold higher than the second Y axis threshold.

5. A method for moving contents in an electronic device having a touch screen, the method comprising:
   detecting a touch point on the touch screen;
   setting the touch point as an initial touch point;
   establishing an initial threshold region surrounding the initial touch point, the initial threshold region bounded by an intersection of an X channel and a Y channel, each having a respective uniform width;
   detecting a drag movement from the initial touch point;
   maintaining the contents fixed at a current position if the detected drag movement moves to a touch point within the initial threshold region;
   moving the contents if the detected drag movement moves from the initial touch point to a second touch point outside the initial threshold region, such that if the second touch point is disposed within the X or Y channel, the contents are moved in an X or Y direction, respectively;
   in response to detecting a continued movement of the detected drag movement from the initial touch point inside the initial threshold region to the second touch point outside the initial threshold region, expanding the initial threshold region by increasing the uniform width of the X or Y channel within which the continued movement of the detected drag movement occurs, so as to maintain a continued movement of the contents in an initially set direction;
   after the initial threshold region is expanded, if the second touch point was within the X channel, moving the contents further in the X direction when the drag movement continues anywhere within the X channel in a direction having an X-axis component;
   if the second touch point was within the Y channel, moving the contents further in the Y direction when the drag movement continues anywhere within the Y channel in a direction having a Y-axis component; and
   moving the contents in the direction of the detected drag movement, if the second touch point is disposed outside both, the X and Y channels.

6. The method of claim 5, wherein if the second touch point is disposed within the X channel and outside the Y channel, the contents are moved in the X direction excluding any movements in the Y direction;
   wherein if the second touch point is disposed within the Y channel and outside the X channel, the contents are moved in the Y direction excluding any movements in the X direction; and
   wherein if the second touch point is outside both the X and Y channels, the contents are moved according to a direction of the drag movement.

7. The method of claim 5, wherein after the initial threshold region is expanded, the contents are moved in the direction of the drag movement if the drag movement breaches the expanded initial threshold region, the method further comprising:
   in response to detecting termination of the continued movement of the detected drag movement, resetting the expanded initial threshold region to an original width.

8. The method of claim 5, wherein:
   the initial threshold region is bounded by a first X axis threshold and a first Y axis threshold;
   the initial threshold region is expanded by defining a second X axis threshold higher than the first X axis threshold when the drag movement is within the Y channel, and the second X axis threshold is set to a third X axis threshold higher than the second X axis threshold following additional drag movement according to a criteria; and
   the initial threshold region is expanded by defining a second Y axis threshold higher than the first Y axis threshold when the drag movement is within the X channel, and the second Y axis threshold is reset to a third Y axis threshold higher than the second Y axis threshold.

9. A non-transitory recording medium readable within an electronic device having a touch screen, the recording medium storing instructions which, when executed by a controller of the electronic device, cause the electronic device to:
   display contents on the touch screen and detect a touch point to the contents;
   set the touch point as an initial touch point;
   establish an initial threshold region surrounding the initial touch point, the initial threshold region bounded by an intersection of an X channel and a Y channel, each having a respective uniform width;
   detecting a drag movement from the initial touch point;
   maintain the contents at a current position if the detected drag movement moves to a touch point within the initial threshold region;
   move the contents if the detected drag movement moves from the initial touch point to a second touch point outside the initial threshold region, such that if the second touch point is disposed within the X or Y channel, the contents are moved in an X or Y direction, respectively;
   in response to detecting a continued movement of the detected drag movement from the initial touch point inside the initial threshold region to the second touch point outside the initial threshold region, expand the initial threshold region by increasing the uniform width of the X or Y channel within which the continued movement of the detected drag movement occurs, so as to maintain a continued movement of the contents in an initially set direction;
   after the initial threshold region is expanded, if the second touch point was within the X channel, move the contents further in the X direction when the drag movement continues anywhere within the X channel in a direction having an X-axis component;

if the second touch point was within the Y channel, move the contents further in the Y direction when the drag movement continues anywhere within the Y channel in a direction having a Y-axis component; and move the contents in the direction of the detected drag movement, if the second touch point is disposed outside both, the X and Y channels.

\* \* \* \* \*